US012773699B2

(12) United States Patent
Yule et al.

(10) Patent No.: US 12,773,699 B2
(45) Date of Patent: Oct. 27, 2026

(54) SHREDDER WITH FLUID-IMMERSION SHREDDING CHAMBER

(71) Applicant: SHRED-TECH CORPORATION, Cambridge (CA)

(72) Inventors: Robert Campbell Yule, Cambridge (CA); Kevin Van Dekerkhove, Cambridge (CA); Constantin Vasilescu, Cambridge (CA); Jerrett Timothy Bellamy, Ayr (CA)

(73) Assignee: SHRED-TECH CORPORATION, Cambridge (CA)

( * ) Notice: Subject to any disclaimer, the term of this patent is extended or adjusted under 35 U.S.C. 154(b) by 346 days.

(21) Appl. No.: 18/099,897

(22) Filed: Jan. 20, 2023

(65) Prior Publication Data

US 2023/0234071 A1 Jul. 27, 2023

Related U.S. Application Data

(60) Provisional application No. 63/436,019, filed on Dec. 29, 2022, provisional application No. 63/301,743, filed on Jan. 21, 2022.

(51) Int. Cl.
*B02C 23/36* (2006.01)
*B02C 23/00* (2006.01)
(Continued)

(52) U.S. Cl.
CPC .............. *B02C 23/36* (2013.01); *B02C 23/00* (2013.01); *B02C 23/06* (2013.01); *B02C 23/18* (2013.01); *B02C 23/24* (2013.01); *B02C 23/26* (2013.01)

(58) Field of Classification Search
CPC ......... B02C 23/00; B02C 23/06; B02C 23/18; B02C 23/24; B02C 23/26; B02C 23/36; B02C 18/24; B02C 18/38
See application file for complete search history.

(56) References Cited

U.S. PATENT DOCUMENTS 3,866,924 A * 2/1975 French ................. F16J 15/3224 277/579
4,482,194 A * 11/1984 Chambers, Sr. ..... F16J 15/3456 384/480

(Continued)

FOREIGN PATENT DOCUMENTS

JP 07-016485 A 1/1995
JP 2008-073620 A 4/2008

OTHER PUBLICATIONS

Office Action received for Japanese Patent Application No. 2024-543417, mailed on Jul. 29, 2025, 10 pages (5 pages of English Translation and 5 pages of Original OA).

(Continued)

*Primary Examiner* — Christopher L Templeton
*Assistant Examiner* — Matthew Stephens
(74) *Attorney, Agent, or Firm* — Shook, Hardy & Bacon L.L.P.

(57) ABSTRACT

This disclosure relates to a shredder with a fluid-immersion shredding chamber and a sealing assembly for containing fluid in the shredding chamber. For example, the shredding chamber can include a plurality of shredding instruments (e.g., teeth, knives, etc.) that are manipulated (e.g., rotated, spun, reciprocated, etc.) to shred or otherwise disassemble various objects (e.g., batteries). In some examples, the shredding instruments are mounted on a shaft that rotates to manipulate (e.g., turn) the shredding instruments inside the chamber. In addition, the shaft can interface with (e.g., insert into and exit from) the shredding chamber through an opening in a sidewall of the shredding chamber, and examples of the present disclosure are directed to a sealing assembly for reducing the likelihood that fluid from the chamber might leak through the opening

20 Claims, 14 Drawing Sheets

(51) Int. Cl.

| | |
|---|---|
| ***B02C 23/06*** | (2006.01) |
| ***B02C 23/18*** | (2006.01) |
| ***B02C 23/24*** | (2006.01) |
| ***B02C 23/26*** | (2006.01) |

(56) References Cited

U.S. PATENT DOCUMENTS

| | | | | |
|---|---|---|---|---|
| 4,538,821 | A * | 9/1985 | Wallace | F16J 15/004 277/374 |
| 5,354,004 | A | 10/1994 | Chambers et al. | |
| 5,551,708 | A * | 9/1996 | Vesey | F16J 15/3464 277/390 |
| 6,095,780 | A * | 8/2000 | Ernens | F04C 27/009 418/104 |
| 6,224,322 | B1 * | 5/2001 | Calboreanu | F04D 29/126 415/113 |
| 9,644,746 | B2 * | 5/2017 | Yanagisawa | F16J 15/3468 241/236 |
| 2011/0084154 | A1 * | 4/2011 | Amburgey | B02C 18/0092 241/24.1 |
| 2011/0284675 | A1 * | 11/2011 | Amburgey | B02C 18/16 277/377 |
| 2019/0048929 | A1 | 2/2019 | Schwelling | |

OTHER PUBLICATIONS

International Search Report and Written Opinion received for PCT Patent Application No. PCT/IB2023/050520, mailed on Mar. 23, 2023, 11 pages.

* cited by examiner

SHREDDER WITH FLUID-IMMERSION SHREDDING CHAMBER

CROSS REFERENCE TO RELATED APPLICATIONS

This application claims priority to, and the benefit of, U.S. Provisional Application No. 63/436,019 (filed Dec. 29, 2022) and U.S. Provisional Application No. 63/301,743 (filed Jan. 21, 2022). Each of the aforementioned applications is incorporated herein by reference in its entirety.

BACKGROUND

Materials shredders can be used to shred a variety of different articles, materials, etc. For example, lithium-ion batteries are used commonly in various consumer electronics and other products (e.g., cellphones, laptops, power tools, electric vehicles, and a vast number of other applications), and as the number of lithium-ion batteries has increased, the need for disposing of and/or reusing the materials of such batteries has also increased. Often, materials shredders are used to recycle, or otherwise dispose of, lithium-ion batteries.

Some material shredders can include a fluid-immersion shredding chamber. For example, the shredder can include an assembly of shredding instruments (e.g., teeth, knives, grinders, etc.) that are positioned in the shredding chamber, immersed in the fluid, and manipulated (e.g., rotated, spun, etc.) to shred one or more articles, materials, etc. In some examples, immersing the shredding instruments in a fluid can help retain shredded material and improve material recovery. For example, fluid-immersion shredders can be used to shred lithium-ion batteries (e.g., for recycling, disposal, etc.), and the fluid-immersion chamber can contribute to retaining and shredded portions of the batteries.

DETAILED DESCRIPTION OF DRAWINGS

The present systems and methods for a shredder with fluid-immersion shredding chamber are described in detail below with reference to these figures.

Figure 11:
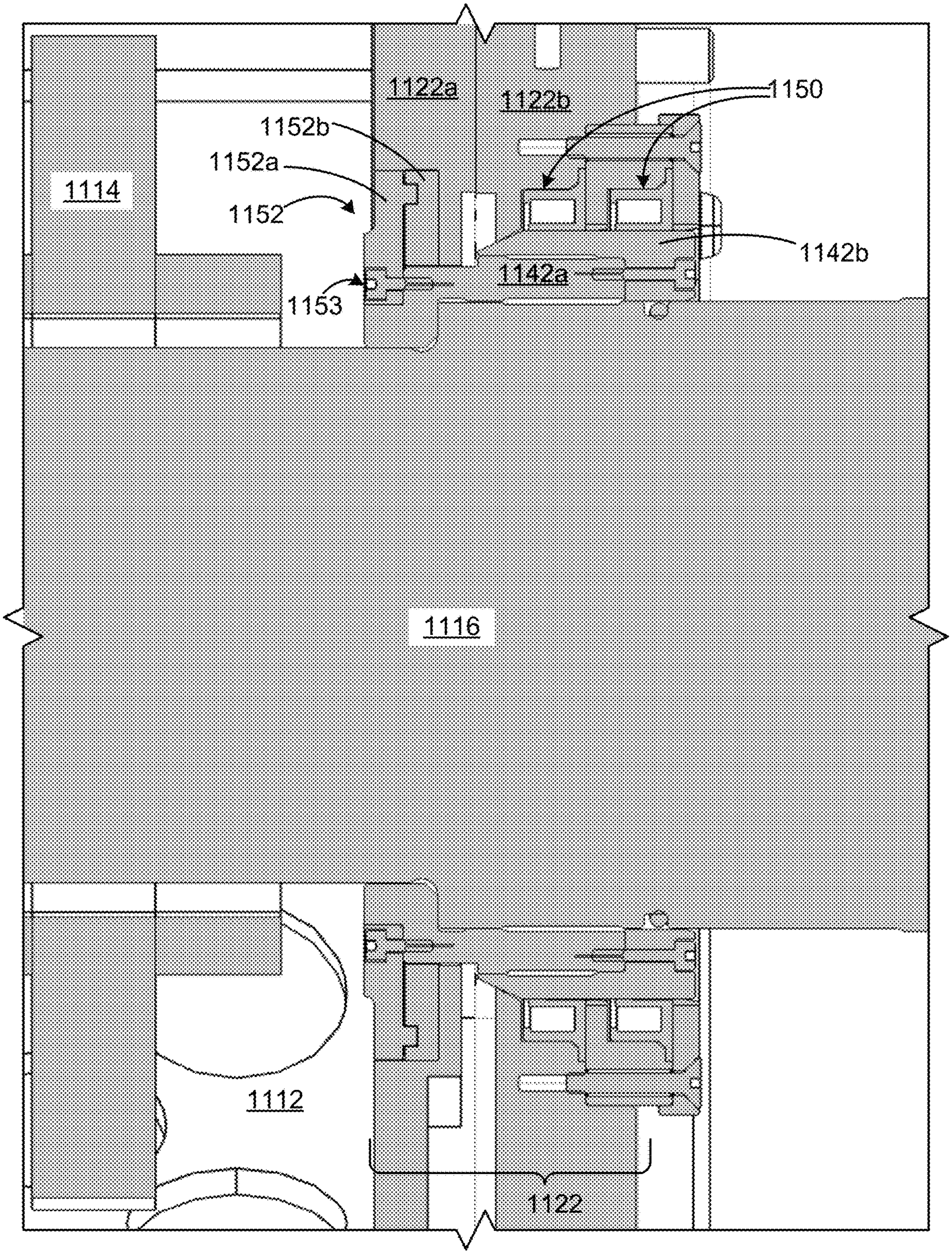
FIG. 11 depicts a cross sectional view of a shaft with a labyrinth seal and lip seals in accordance with certain aspects of the present disclosure.
Figure 12A:
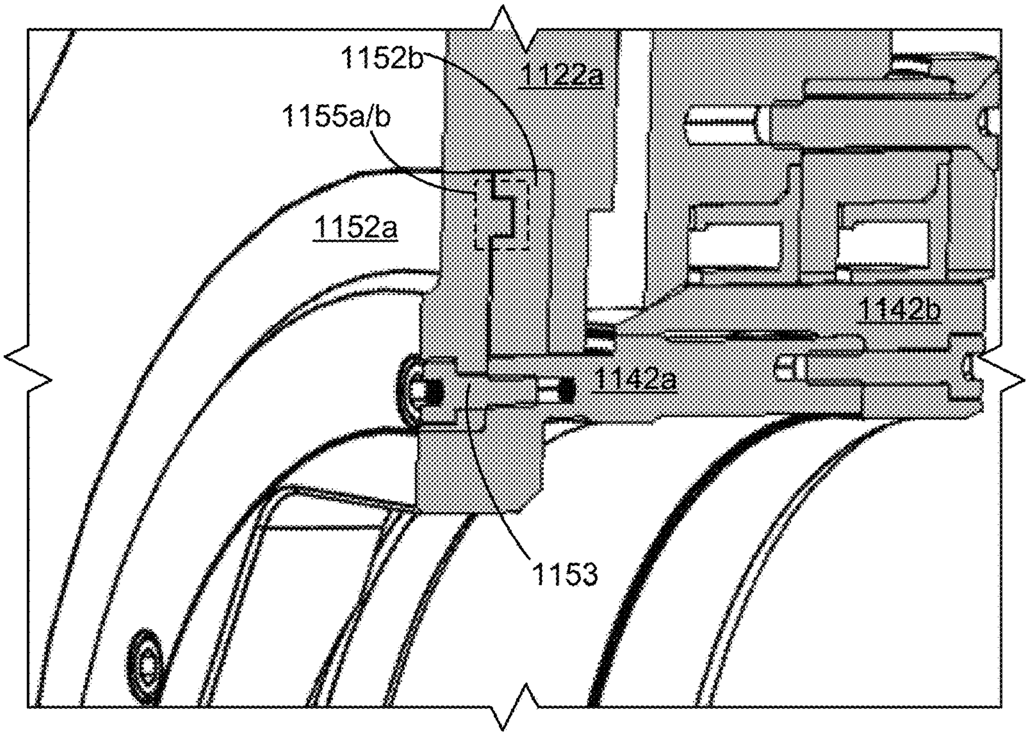
Figure 12B:
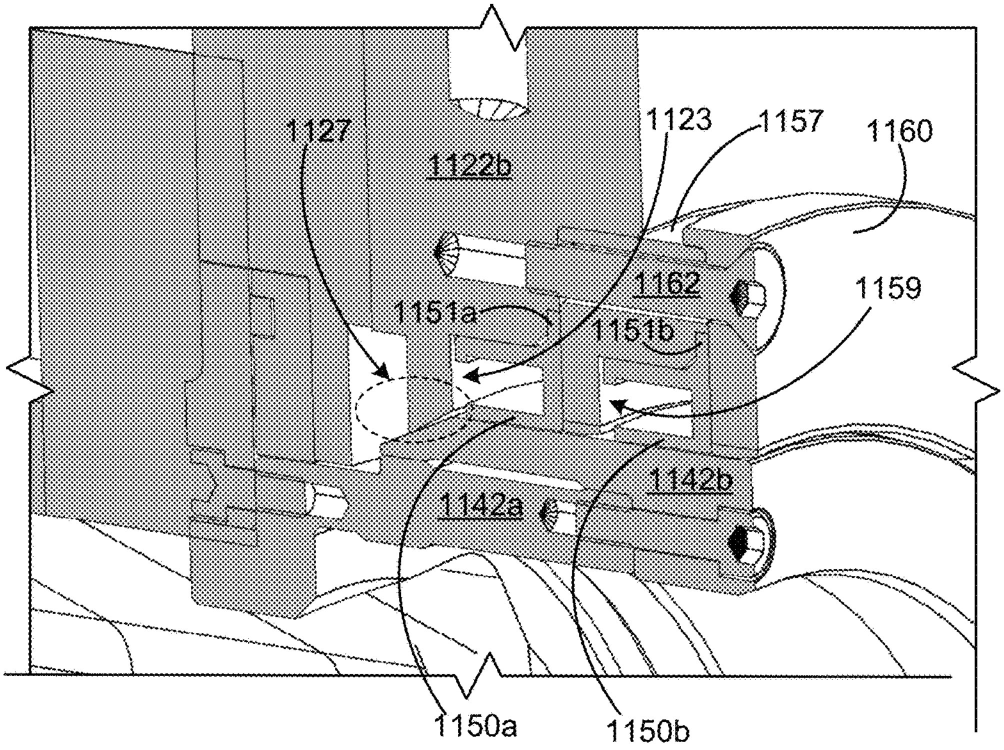

FIGS. 12A and 12B include perspective views of examples related to FIG. 11 in accordance with certain aspects of the present disclosure.

Figure 13A:
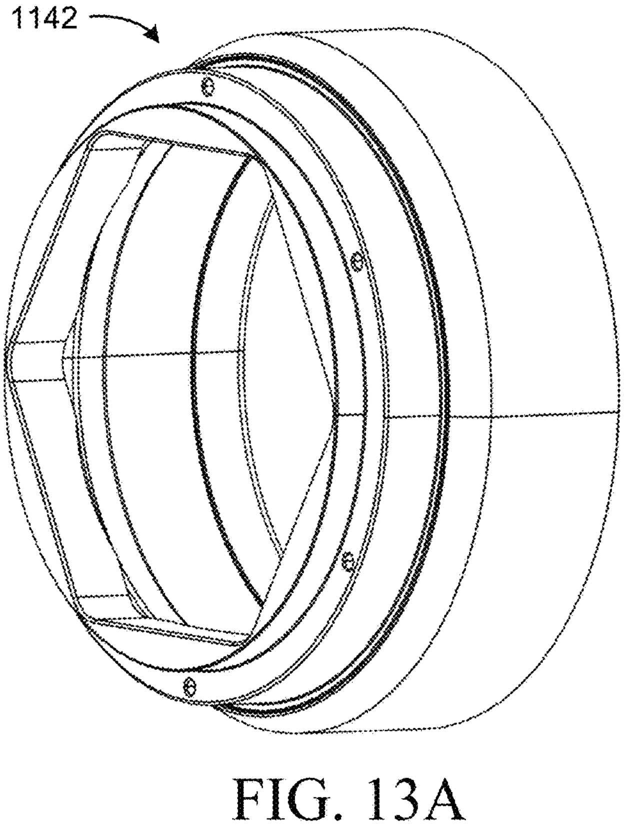
Figure 13B:
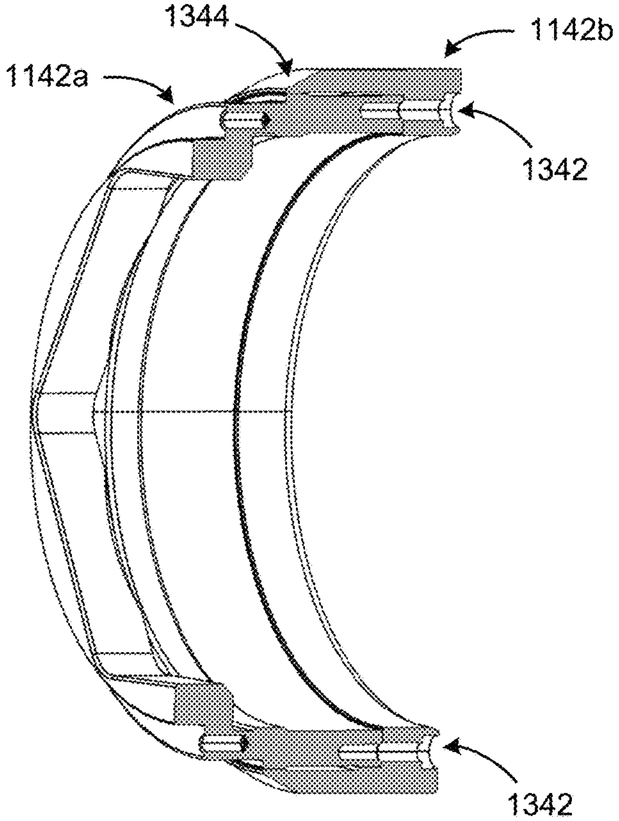

FIGS. 13A and 13B show different examples of a sleeve in accordance with certain aspects of the present disclosure.

DETAILED DESCRIPTION

This detailed description is related to a shredder with a fluid-immersion shredding chamber (e.g., a fluid-immersion shredder). In addition, this detailed description is related to a sealing assembly for containing fluid in the shredding chamber. For example, the shredding chamber can include a plurality of shredding instruments (e.g., teeth, knives, etc.) that are manipulated (e.g., rotated, spun, reciprocated, etc.) to shred or otherwise disassemble various objects (e.g., batteries). In some examples, the shredding instruments are mounted on a shaft that rotates to manipulate (e.g., turn) the shredding instruments inside the chamber. In addition, the shaft can interface with (e.g., insert into and exit from) the shredding chamber through an opening in a sidewall of the shredding chamber. At least some examples of the present disclosure are directed to one or more sealing assemblies for reducing the likelihood that fluid from the chamber might leak through the opening.

Examples of the present disclosure can include one or more sealing assemblies at various locations or positions relative to the opening in the shredding-chamber sidewall. That is, often the interface associated with the sidewall (e.g., the opening in the sidewall) and the shaft can include various structures and relative positions, such as positions within the opening and positions on either side of the opening. In examples of this disclosure, one or more sealing assemblies can be positioned within the opening and/or on either side of the opening (e.g., on either side of the sidewall where the shaft passes through the sidewall).

In at least some examples, one or more sealing assemblies are arranged within the opening and in the space directly between the outer face of the shaft and the shredding-chamber sidewall. For example, in some instances, a mechanical seal is arranged within the opening and in the space directly between the outer face of the shaft and the shredding-chamber sidewall. In some examples, a lip seal is arranged within the opening and in the space directly between the outer face of the shaft and the shredding-chamber sidewall. In some examples, a labyrinth seal is arranged within the opening and in the space directly between the outer face of the shaft and the shredding-chamber sidewall. In some examples, a wiper seal is arranged within the opening and in the space directly between the outer face of the shaft and the shredding-chamber sidewall.

In some examples, multiple seals can be arranged within the opening and in the space directly between the outer face of the shaft and the shredding-chamber sidewall. Arranging multiple seals within the opening and in the space directly between the outer face of the shaft and the shredding-chamber sidewall can reduce the likelihood of fluid escaping from the shredding chamber. For example, in some instances two or more seals can be arranged within the opening and in the space directly between the outer face of the shaft and the shredding-chamber sidewall, and the two or more seals can be include a mechanical seal, a lip seal, a labyrinth seal, and/or a wiper seal. In some examples, the two or more seals can include a same type of seal. In some examples, the two or more seals can include a different type of seal. For example, a mechanical seal and a wiper seal can be arranged within the opening and in the space directly between the outer face of the shaft and the shredding-chamber sidewall. In some examples, a labyrinth seal and a lip seal can be arranged within the opening and in the space directly between the outer face of the shaft and the shredding-chamber sidewall.

In at least some examples, one or more sealing assemblies are arranged on either side of the opening (e.g., on either side of the sidewall where the shaft passes through the sidewall). For instance, a sealing assembly can be positioned around the shaft and relative to (e.g., adjacent to or facing) an inner face of the sidewall (e.g., within the shredding chamber). In some instances, a sealing assembly can be positioned around the shaft and relative to (e.g., adjacent to or facing) an outer face of the sidewall (e.g., on the outside of the shredding chamber). For example, in at least some instances, the sealing assembly can include a spacer that circumscribes the shaft, that is positioned adjacent the chamber sidewall near the periphery of the opening, and that impedes fluid and/or shredded pieces from leaking through the opening.

In at least some examples, one or more sealing assemblies are arranged within the opening and in the space directly between the outer face of the shaft and the shredding-chamber sidewall, and one or more sealing assemblies are arranged on either side of the opening (e.g., within the shredding chamber and adjacent the sidewall where the shaft passes through the opening). As such, in some examples, at least three different sealing assemblies can be positioned relative to the interface between the shaft and the opening, which can significantly reduce the likelihood of fluid leaking from the shredding chamber.

Various examples are described below with reference to the drawings, and the structure, relationship, and/or functioning of examples can, in some instances, be better understood by reference to this detailed description. However, examples associated with the subject matter of this application are not limited to those illustrated in the drawings or explicitly described below. The drawings might not necessarily be to scale. In some instances, for clarity, brevity, and/or simplicity details might have been omitted, which does not preclude the inclusion of those details in association with examples of this disclosure.

Figure 1:
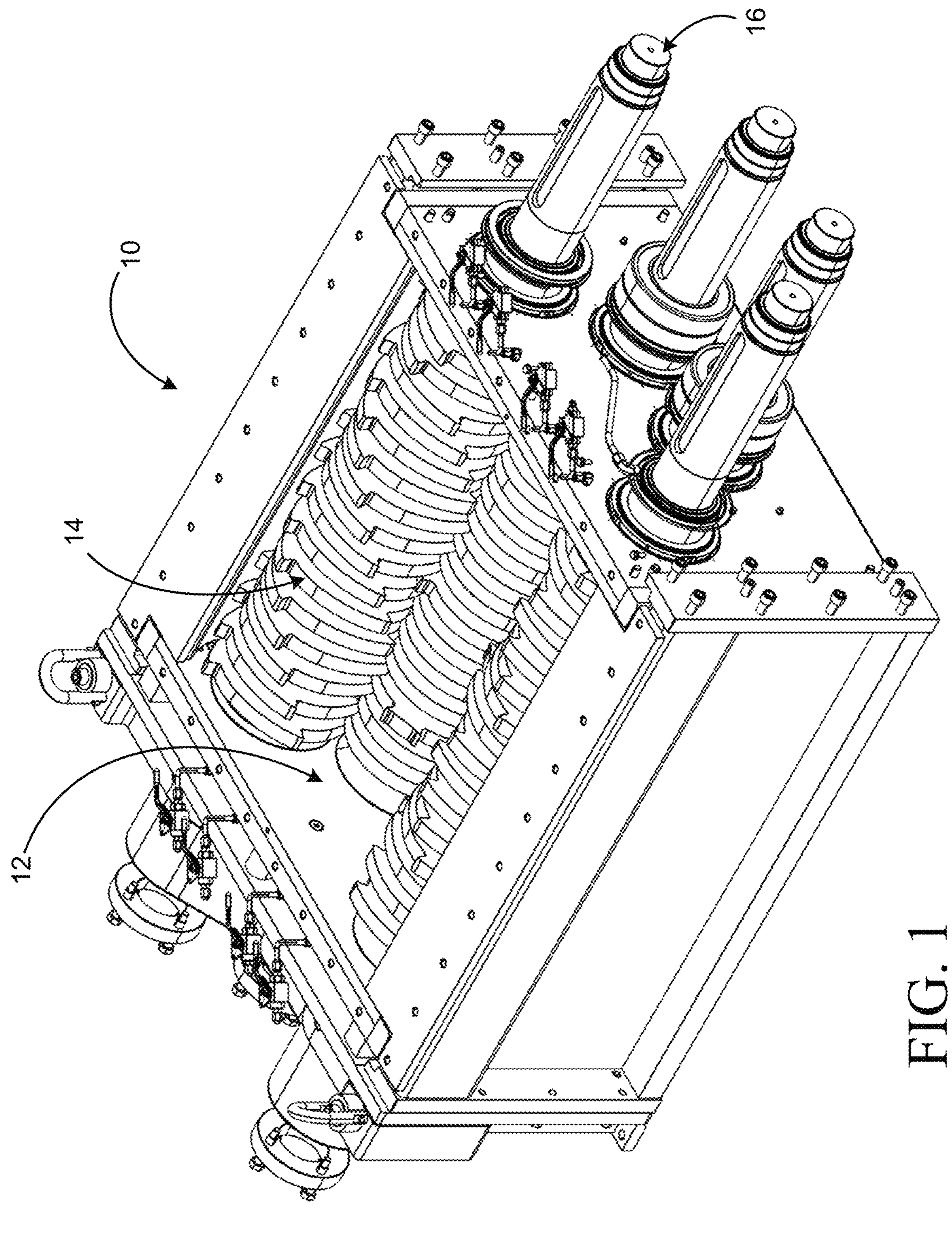
FIG. 1 depicts a shredding assembly, in accordance with examples of this disclosure.

Referring now to FIG. 1, FIG. 1 depicts a shredder 10 with a shredding chamber 12, which can, in some examples, contain a fluid. In addition, the shredder 10 includes shredding instruments 14 (e.g., teeth, knives, etc.) that are arranged inside the shredding chamber 12 and that can be immersed in fluid (not illustrated) contained within the shredding chamber 12. In at least some examples, the shredding instruments 14 can be affixed to a shaft 16 (e.g., drive shaft) that, when rotated, can manipulate the shredding instruments 14 to shred, grind, or otherwise break apart articles (e.g., lithium-ion batteries) introduced into the shredding chamber 12. In some examples, the shredder 10 can include multiple shafts and multiple sets of shredding instruments. For example, the shredder 10 in FIG. 1 includes four shafts and four sets of shredding instruments. In some examples, a shredder can include fewer shafts and fewer sets of shredding instruments. In some examples, a shredder can include more than four shafts and more than four sets of shredding instruments. For brevity, this disclosure might describe one of the shafts, and it is understood that the same description can apply to other shafts.

Optionally, the chamber 102 may be at least partially surrounded by a protective guard 103, which may substantially retain objects within the chamber during the shredding process.

The drive shaft 16 may be the primary mechanism for causing movement of the shredding instruments 14. Thus, a portion 17 of the shaft 16 (e.g., external to the shredding chamber 12) can be mechanically coupled to a drive system (not shown), which may include a motor, engine, or any other suitable device capable of powering the shredder via rotation of the drive shaft 16. For example, rotation of the drive shaft 16 can be caused by rotation of a set of rollers that directly contact the drive shaft 16, and other systems, features, methods, etc. of causing rotation of the drive shaft 16 are alternatively contemplated.

A fluid-immersion shredding chamber 12 can be associated with various advantages. For example, in the instance of shredding a lithium-ion battery, particular immersion liquids may help liberate/remove lithium metal and cathode materials from within other battery materials, thereby enhancing the shredding process due to ease of separating different materials, and/or allowing for collection and reusability of such materials as discussed in the background above. Such an immersion liquid may include entrained electrolyte materials, for example. Other non-limiting advantages of performing the shredding/separating process under immersion may include enhanced heat management, insulation and/or neutralization of hazardous materials (e.g., due to chemical characteristics of the immersion liquid selected for a particular battery or other object), enhanced waste management, etc. While the present embodiments generally discuss liquid immersion, it is also contemplated that other fluids, such as inert gases, may be utilized in a similar manner.

Figure 2A:
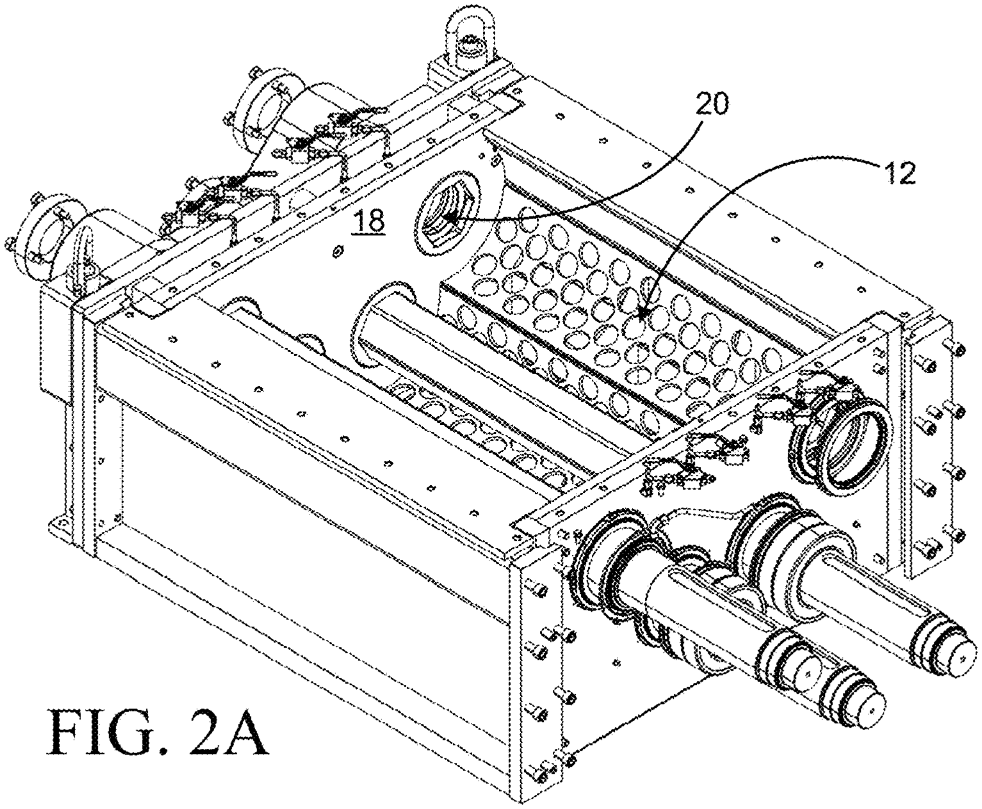
FIG. 2A depicts the shredding assembly in FIG. 1 with shredding instruments and a shaft omitted to reveal an opening in a wall of the shredding assembly.
Figure 2B:
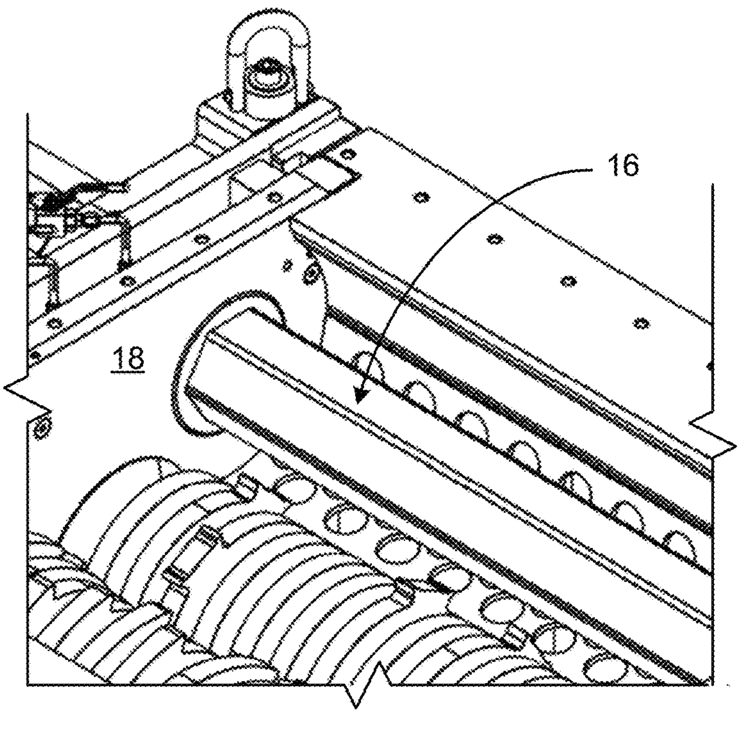
FIG. 2B depicts the shredding assembly of FIG. 2A with the shaft.

Referring to FIGS. 2A, 2B, 3A, and 3B, some parts of the shredder 10 are omitted for clarity and to allow other parts of the shredder 10 to be viewed (not obscured). In examples, the shaft 16 can extend into an inner volume of the shredding chamber 12. For example, the shredding chamber 12 can include a first wall 18 (FIGS. 2A and 2B) with an opening 20, and in some examples, at least a portion of the shaft 16 can extend through the opening 20 (e.g., as shown in FIG. 2B). In addition, the shredding chamber 12 can include a second wall 22 (FIGS. 3A and 3B) with an opening 24, and in some examples, at least a portion of the shaft 16 can extend through the opening 24. In some examples, the walls 18 and 22 can form at least part of a bulkhead associated with the shredding chamber 12. In addition, one or more of the walls 18 and 22 can include multiple wall panels (e.g., an inner wall panel and an outer wall panel).

When a liquid chamber (or other chamber) is used, it is generally desirable for the liquid to be contained within the chamber 12. For example, it may be desirable or necessary for other components of the shredding system 10, such as the drive system adjacent to the portion 17 of the drive shaft 16, to be isolated from the liquid and/or other materials inside the chamber 12. A challenge of such a system is that a liquid-tight seal must be created where the shaft 16 interfaces with the chamber 12 (e.g., where the shaft 16 passes into the chamber 12 via an opening) that maintains its sealing integrity during shaft rotation.

Absent examples of the subject application, the shredding chamber 12 can be susceptible to leaking fluid and/or shredded fragments in association with the openings 20 and 24. For example, as the shaft 16 moves (e.g., spins or rotates) and is subject to various forces (e.g., lateral shifting due to contacting shredded articles), gaps between parts associated with the opening can allow fluid and/or fragments to leak or escape. However, in contrast to conventional shredders, examples of the present disclosure include one or more sealing assemblies at various locations or positions relative to the opening (e.g., 20 and/or 24) in the shredding-chamber sidewall (e.g., 18 and/or 22).

In examples, of the present disclosure, the interface between the opening in the sidewall and the shaft can include various structures and relative positions, such as positions within the opening and positions on either side of the opening. For example, referring to FIG. 3C, a cross sectional view depicts an interface 23 between the shaft 16 and the sidewall 22, as the shaft 16 extends through the opening 24. In some examples, the sidewall 22 can include an inner panel 22A or wall and an outer panel 22B or wall. Based on a size 17 of the shaft 16 (e.g., diameter or other cross dimension 17) and a size 25 associated with the space 24, a gap can exist between the outer face of the shaft 16 and the outer periphery of the opening 24. Examples of the present disclosure can include one or more sealing assemblies located in one or more positions relative to the interface 23 (e.g., relative to the gap between the shaft 16 and the outer periphery of the opening 24).

In at least some examples, a sealing assembly can be arranged inside the shredding chamber 12 an in front of a mouth to the opening 24, such as in the region identified by reference numeral 23A.

In at least some examples, a sealing assembly can be arranged outside the shredding chamber 12 and in front of a mouth to the opening 24, such as in the region identified by reference numeral 23B.

In at least some examples, a sealing assembly can be arranged within the opening 24, and closer to an inner side of the wall 22, such as in the region identified by reference numeral 23C and closer to the inner panel 22A.

In at least some examples, a sealing assembly can be arranged within the opening 24, and closer to an outer side of the wall 22, such as in the region identified by reference numeral 23D and closer to the outer panel 22B.

In at least some examples, one or more sealing assemblies can be arranged in one or more of the regions 23A through 23D.

In at least some examples, a fluid-immersion shredder 10 can include a spacer that at least partially circumscribes the shaft 16 and that is positioned adjacent the walls of the shredding chamber 12 and around the periphery of the openings. For example, in the example associated with FIG. 3C, the spacer could be positioned in the region 23A and/or the region 23B. Referring to FIGS. 4A and 4B, example spacers 426 and 428 are depicted that are coupled to the shaft 16, that are positioned adjacent the walls 18 and 22 (respectively) of the shredding chamber 12, and that reduce the likelihood of fluid and/or fragments leaking or escaping from the shredding chamber 12.

Figure 5A:
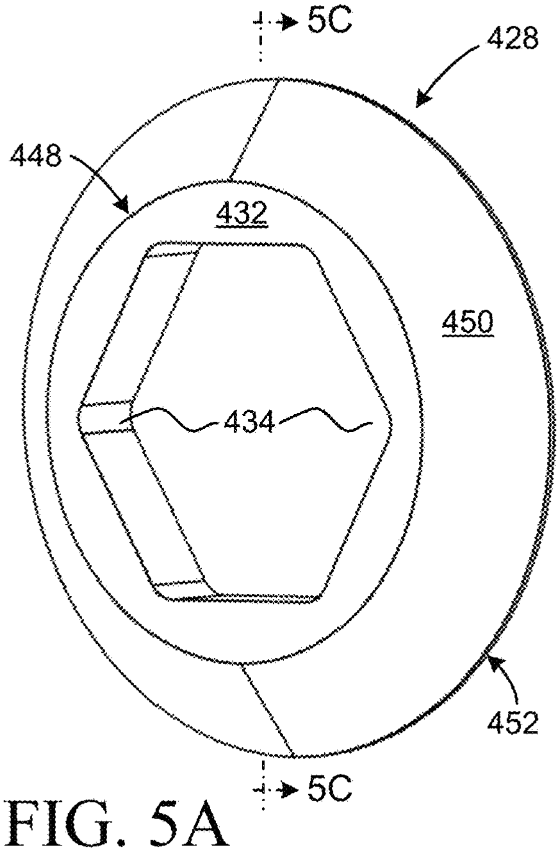
FIGS. 5A-5C depict different views associated with a spacer.
Figure 5B:
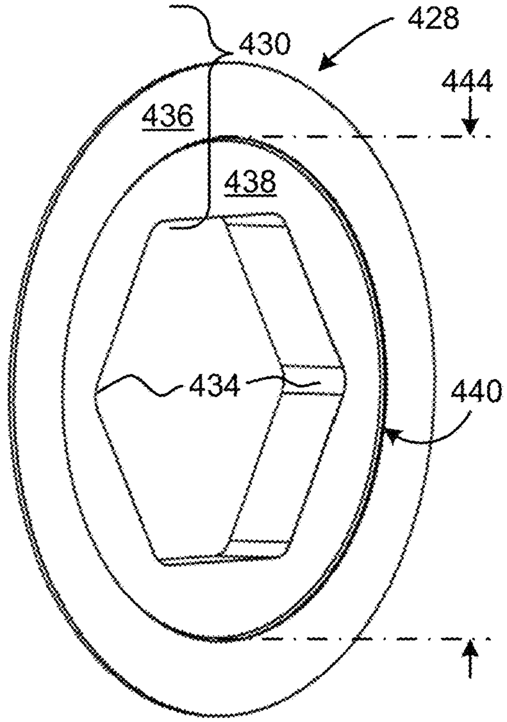
Figure 5C:
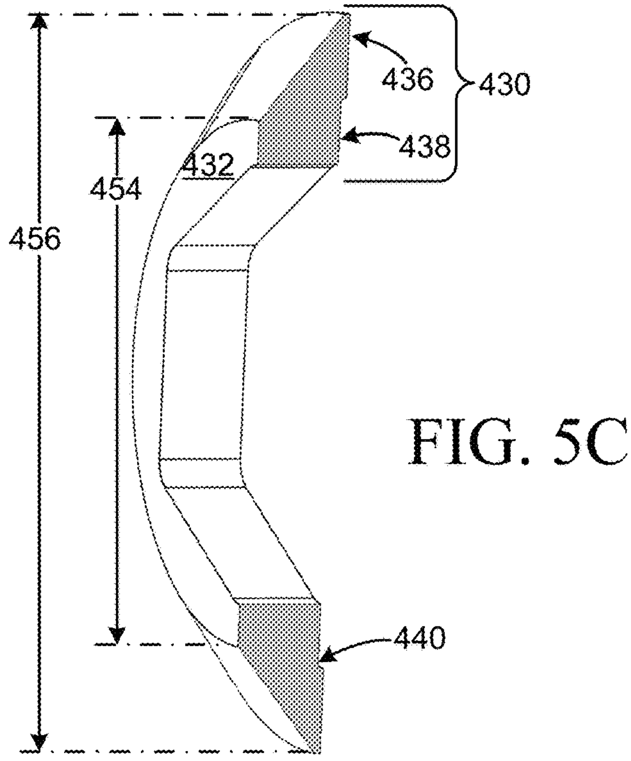

Referring to FIGS. 5A-5C, the spacer 428 is shown in isolated, enlarged views, and the description associated with FIGS. 5A-5C can also apply to the spacer 426. In at least some examples, the spacer 428 includes a first face 430 that is configured to face towards a shredding-chamber wall (e.g., the wall 18 or the wall 22) and a second face 432 that is configured to face away from the shredding-chamber wall. In some examples, the second face faces towards another part that is also coupled to the shaft, such as a shredding instrument (e.g., tooth) or another spacer. In addition, the spacer 428 includes a through hole 434 that extends entirely though a thickness of the spacer 428, from the first face 430 to the second face 432.

In examples, the through hole 434 is associated with a hole profile (e.g., cross sectional profile) that corresponds with a shaft profile (e.g., cross-sectional profile). In other words, the through hole 434 and the shaft can include a keyed relationship. For example, if the shaft includes a hexagon profile (e.g., as depicted by the shaft 16), then the through hole 434 can include a hexagon hole profile. In examples, the profiles can include various shapes and sizes, such as triangular, square, pentagon, star, semi-circle, etc. In examples, a hole profile associated with the through hole includes one or more linear sides, which correspond with a linear side associated with the shaft profile.

In at least some examples, the first face 430 can include a peripheral portion 436 and a more central, inner portion 438, which is recessed relative to the peripheral portion 436. In addition, the first face 430 can include a shoulder 440 that transitions between the peripheral portion 436 and more central, recessed portion 438. The peripheral portion 436 and the central, recessed portion 438 can be configured to operate in different manners. For example, the peripheral portion 436 can be configured for positioning adjacent the wall of the shredding chamber (e.g., a bulkhead wall). In some examples, the central, inner portion 438 can be configured to interface with, or be positioned adjacent, other parts of the shredder assembly (e.g., other sealing components) that can be coupled to the wall, to the shaft, and/or in the opening.

Figure 6:
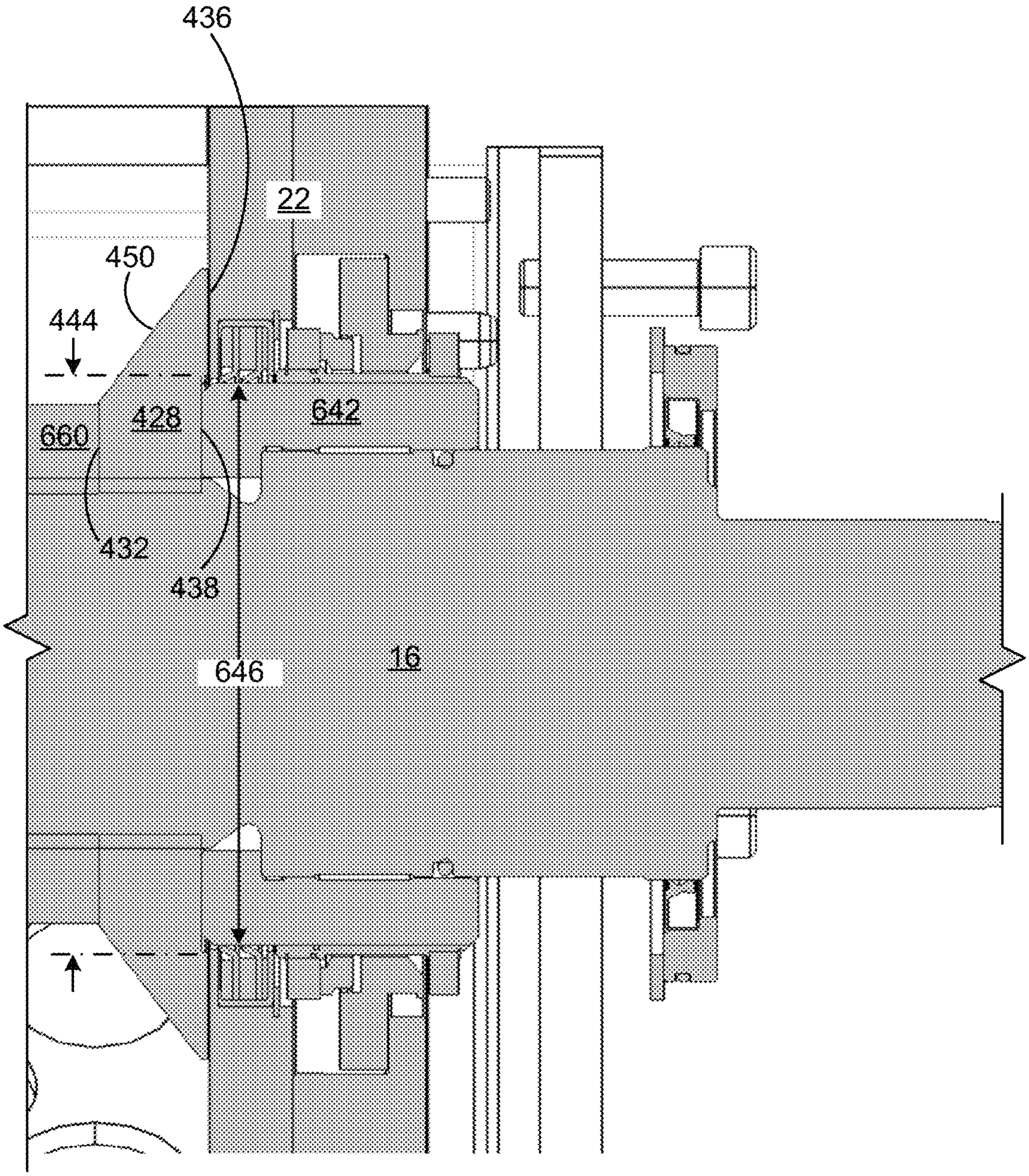
FIG. 6 depicts a cross sectional view of a shaft with the spacer in FIG. 4B.

In some examples, the multi-depth nature of the face 430 can be conducive to the spacer 428 achieving a closer positioning relative to the wall and to other parts arranged near the opening. For example, referring to FIG. 6, a cross-sectional view depicts the spacer 428 relative to the wall 22. In addition, FIG. 6 depicts a sleeve 642 that is coupled to the shaft 16 and that is arranged in the opening 24 (e.g., see also FIG. 3A). In at least some examples, the sleeve 642 protrudes beyond the wall 22 and into the interior volume of the shredding chamber 12. In at least some examples, the face 430 is configured for positioning adjacent both the sleeve 442 and the wall 22. For example, the central, recessed portion 438 can abut the sleeve 642, and the peripheral portion 436 can be positioned adjacent the wall 22 (e.g., face-to-face with the wall 22). In addition, the shoulder 440 and the sleeve 642 can be associated with respective dimensions that reduce the likelihood of the shoulder interfering with the sleeve 42. For example, the shoulder 440 can be associated with a diameter 444 (e.g., FIG. 5B), which is larger than an outer diameter 646 (e.g., FIG. 6) of the sleeve 642.

In at least some examples, the second face 432 of the spacer 428 includes a peripheral edge 448, and at the peripheral edge 448, the spacer 428 can transition from the second face 432 to an angled, annular face 450. The angled, annular face 450 can gradually transition in diameter from a smaller dimension near the peripheral edge 448 of the second face 432 to a larger dimension closer to an outer, terminal edge 452 of the spacer 428. For example, the peripheral edge 448 of the second face 432 can be associated with a diameter 454, and the outer, terminal edge 452 can be associated with a diameter 456, which is larger than the diameter 454. The angled, annular face 450 can gradually transition in dimension from the smaller diameter 454 to the larger diameter 456. In at least some examples, the angled nature of the face 450 can contribute to propelling fluid and/or fragments away from the opening 22, such as when the spacer 428 is rotating on the shaft 16.

In examples, the second face 432 can be configured to fit against another part coupled to the shaft 16. For example, the diameter 454 can be similar to a diameter of another spacer 660 (e.g., FIG. 6) that can also be coupled to the shaft 16 and that can abut the second face 432.

In examples, the spacer 428 can be configured to reduce the likelihood of fluid and/or fragments leaking or otherwise passing through the opening (e.g., 20 or 24). In addition, the shredder 10 can be associated with one or more other sealing components that can reduce the likelihood of fluid and/or fragments leaking. For example, a spacer can be combined with one or more sealing assemblies arranged in one or more of the regions 23B through 23D. Examples of other sealing assemblies that can be arranged in regions 23C and 23D (in combination with a spacer) can include wiper seal assemblies, mechanical seal assemblies, labyrinth seal assemblies, and lip seal assemblies.

Figure 7:
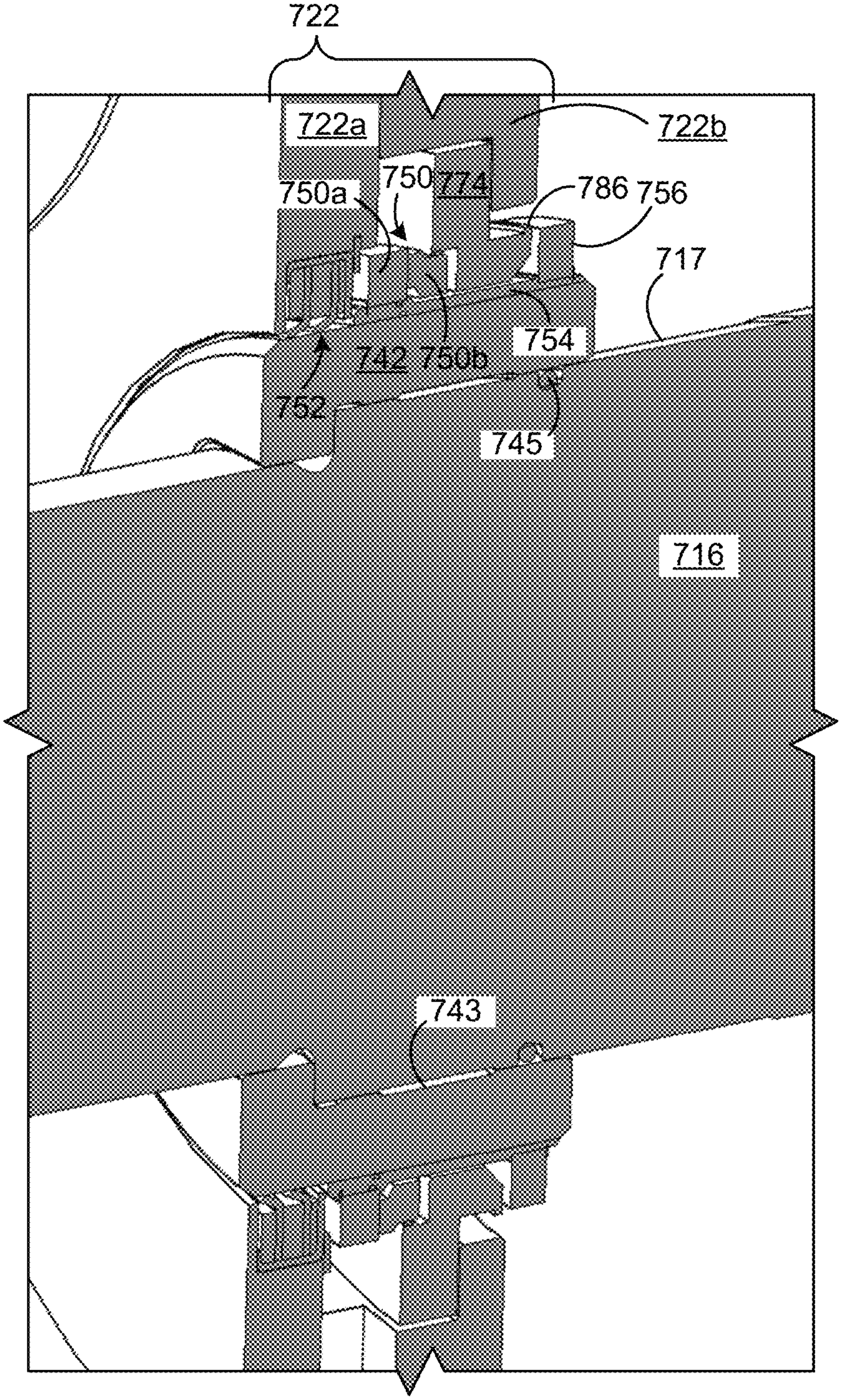
FIG. 7 is a perspective view of a cross section of a shaft with sealing assemblies in accordance with certain aspects of the present disclosure.

Referring to FIG. 7, an example of the present disclosure can include one or more sealing assemblies arranged within the opening (e.g., 20 or 24) and in the space or gap directly between the outer face of the shaft (e.g., 16) and the shredding-chamber sidewall (e.g., 18 or 22). In FIG. 7, a spacer (e.g., 428) is omitted and in some examples, a shredder can include one or more sealing assemblies arranged in the opening without any spacer. In some examples, a shredder can include one or more sealing assemblies arranged in the opening with any spacer (e.g., 428).

A shredder having the assembly associated with FIG. 7 can include a drive shaft 716 (e.g., similar to the shaft 16), as well as one or more sidewalls 722 that form at least part of an enclosure of the shredding chamber. The assembly depicted in FIG. 7 can include any of the other shredder-related features described in other parts of this disclosure (e.g., shredding instruments, such as knives, drive system, etc.).

At least some examples of the present disclosure can include one or more sealing assemblies, such as a mechanical seal 750 (e.g., including a rotating seal 750*a* and a stationary seal 750*b*), a wiper seal 752 (e.g., that is stationary relative to the shaft), or any combination thereof. In some examples, the assembly can include both the mechanical seal 750 and the wiper seal 752. Some assemblies can include the mechanical seal 750 and omit the wiper seal 752 or include another type of seal that is different from the wiper seal (e.g., a labyrinth seal or a lip seal). Some assemblies can include the wiper seal 752 and omit the mechanical seal 750 or include another type of seal that is different from the mechanical seal 750 (e.g., a labyrinth seal or a lip seal). Among other things, the mechanical seal 750 and/or the wiper seal 752 can decrease the likelihood of liquid and/or shredded fragments leaking from the shredding chamber (e.g., through the drive-shaft opening).

The mechanical seal 750 and the wiper seal 752 can be arrange in position using various structures. In some examples, a sleeve 742 (e.g., 642 in FIG. 6) can at least partially surround the drive shaft 716. For example, the sleeve 742 may be a substantially cylindrical component with an inner-diameter surface 743 that abuts the outer-diameter surface 717 of the drive shaft 716. In examples, the sleeve 742 may be integral with the drive shaft 716 and/or excluded altogether (e.g., where the outer diameter surface 717 of the drive shaft 716 itself is configured for compatibility with other components of the sealing assembly without the need for a separate sleeve component).

Figure 8:
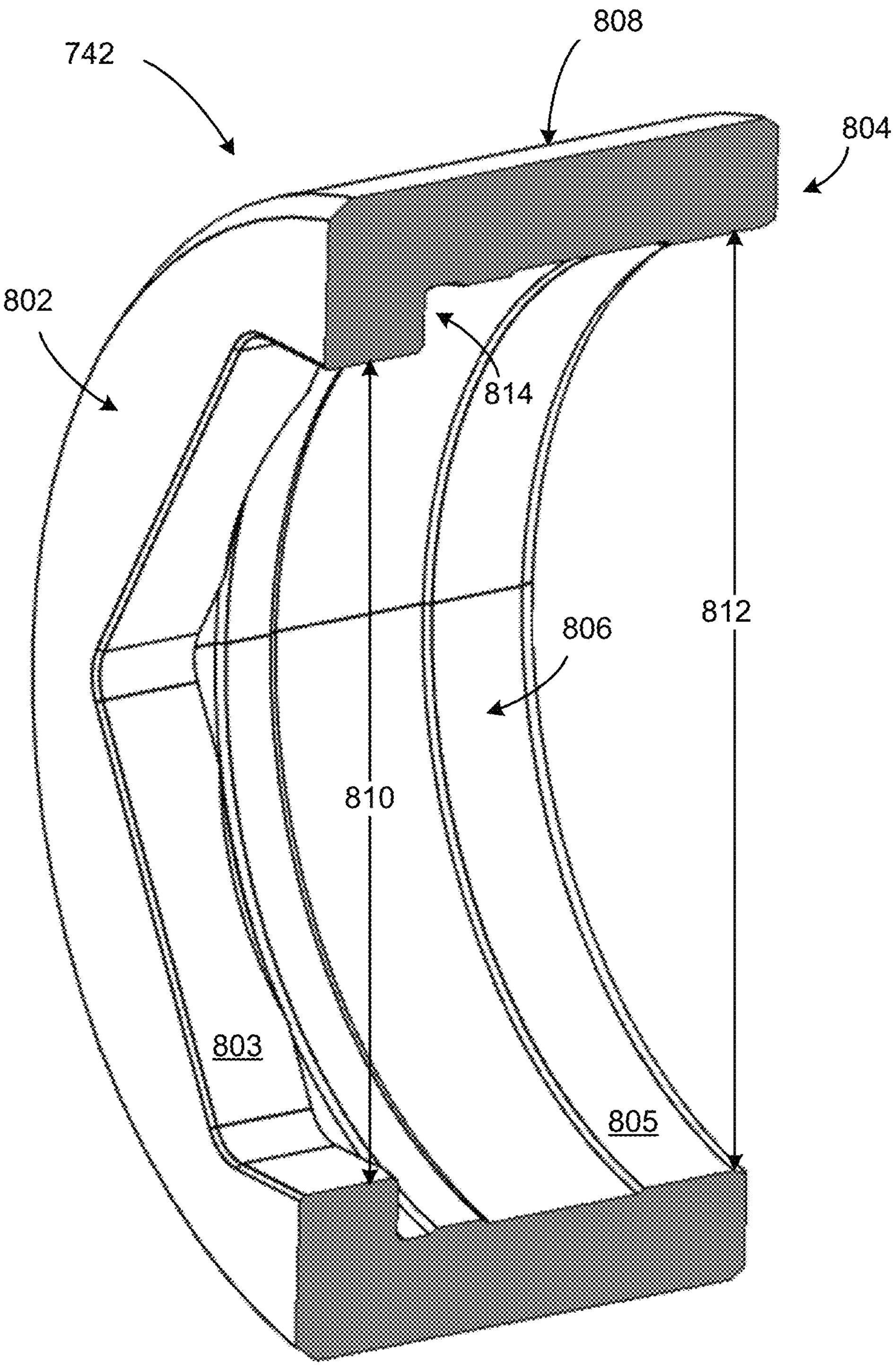
FIG. 8 is a cross sectional view of a sleeve in accordance with certain aspects of the present disclosure.

The sleeve 742 may be fixed to the drive shaft 716 such that when the drive shaft 716 rotates, the sleeve 742 also rotates. Referring to FIG. 8 (which shows an isolated view of the sleeve 742 in cross section), the sleeve 742 can be a tubular structure or ring structure. The sleeve 742 can include a first end 802 and a second end 804, as well as an inner face 806, and an outer face 808. In examples, a portion 803 of the inner face 806 that is closer to the first end 802 includes a first cross dimension 810, and a portion 805 of the inner face 806 closer to the second end 804 includes a second cross dimension 812, which is larger than the first cross dimension 810. In addition, the inner face 806 can include a shoulder 814 that transitions from the first portion 803 with the smaller cross dimension 810 to the second portion 805 with the larger cross dimension 812. In examples, during assembly the sleeve 742 can be slid onto the shaft 716 until the shoulder 814 of the sleeve 742 abuts a corresponding portion of the shaft 716. In addition, an 0-ring, gasket, or other seal 745 can be arranged between the sleeve 742 and the shaft 716.

In at least some examples, the first portion 803 with the smaller cross dimension 810 can include a cross sectional profile associated with an opening through the middle or central portion of the tubular or ring structure (e.g., the shape of the hole or opening through the central portion). In addition, the cross sectional profile associated with the first portion 803 can correspond with a profile shape of the shaft 716. For example, if the shaft 716 includes a hexagon shape profile, then the cross sectional profile associated with the first portion 803 of the sleeve 742 can also include a hexagon. This is an example, and the shapes or profiles of the sleeve 742 and the shaft can include various other corresponding forms. Among other things, the corresponding profile of the first portion 803 and the shaft can allow the sleeve 742 and the shaft 716 to be keyed to one another, such that the sleeve 742 can rotate together with the shaft 716 when the shaft 716 is rotated (e.g., via the motor).

In at least some examples, the outer face 808 of the sleeve 742 can include a relatively consistent outer diameter from the first end 802 to the second end. Among other things, the relatively consistent outer diameter can provide a more even interface for mounting and/or otherwise engaging with sealing assemblies (e.g., more even as compared with the shaft 716 that includes more widely varying outer diameters).

Figure 9A:
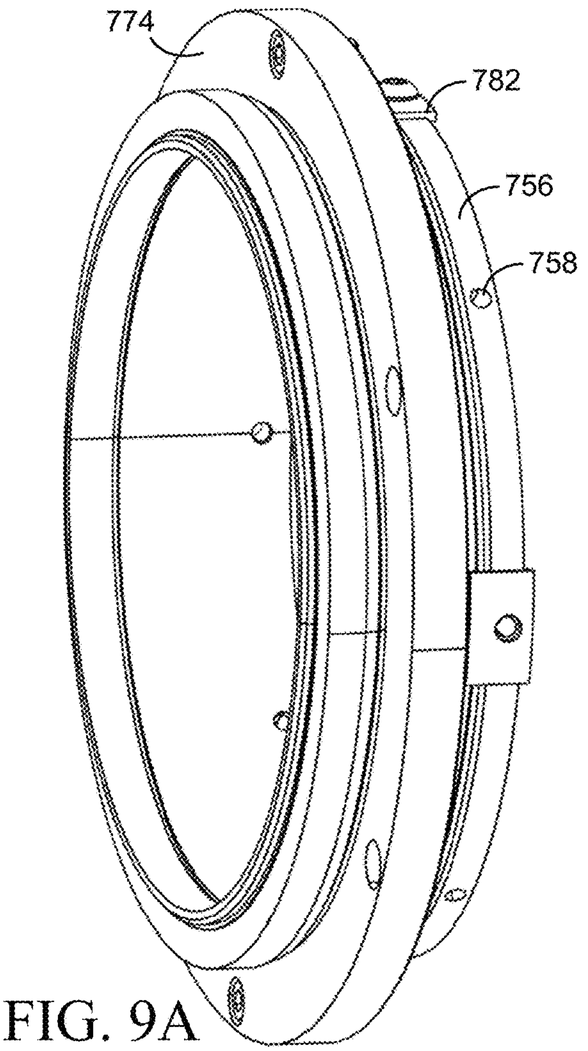
FIGS. 9A-9C depict examples associated with a mechanical seal in accordance with certain aspects of the present disclosure.
Figure 9B:
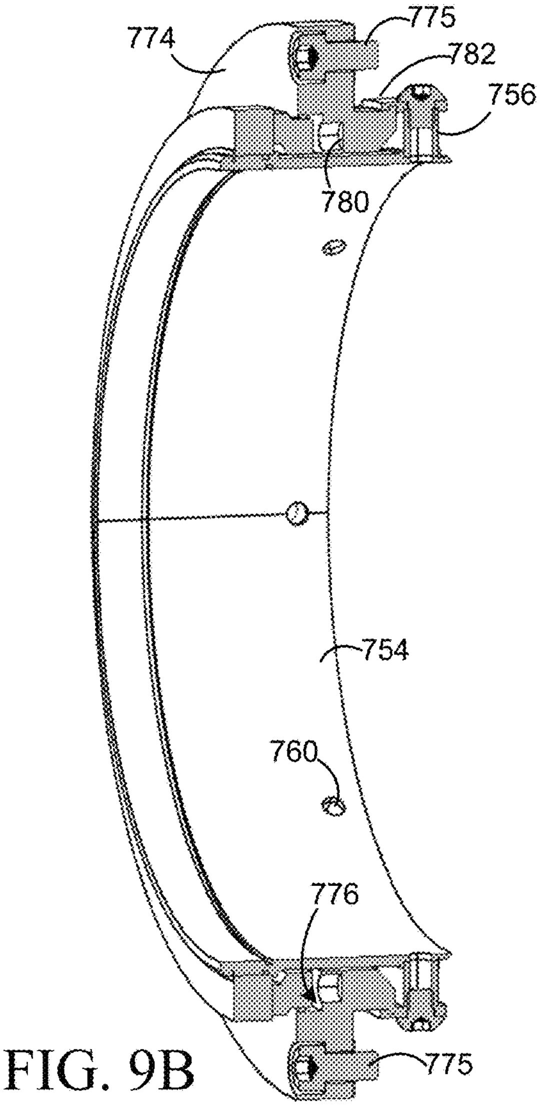

In at least some examples, the assembly can include a seal mounting collar 754 (which may also be referred to as a cylindrical interface) that is affixed to the sleeve 742 (e.g., to an outer face 808 of the sleeve 742) and that extends around the sleeve 742 (e.g., extends circumferentially around the sleeve 742). Referring to FIGS. 9A and 9B, portions of the assembly, including the seal mounting collar 754 and parts of the mechanical seal are shown in isolation (with other parts omitted, such as the shaft 716, the sleeve 742, and other parts of the shredder).

In examples, the seal mounting collar 754 can rotate together with the sleeve 742 and/or the shaft 716. For example, a clamp ring 756 can circumscribe the seal mounting collar 754 and be affixed to an outer face of the seal mounting collar 754. In examples, the clamp ring 756 can include a series of through holes 758 that align with through holes 760 of the seal mounting collar 754, and both the through holes 758 and 760 can receive a fastener to connect the clamp ring 756 to the seal mounting collar 754. In at least some examples, the inner face of the seal mounting collar 754 can frictionally engage the outer face of the sleeve 742. In at least some examples, the fasteners affixed in the through holes 758 and 760 can also engage the outer face of the sleeve 742. One or more other structures can help retain the clamp ring 756 in position. For example, the seal mounting collar 754 can include a shoulder 764 on the outer face, and the collar 756 can abut the shoulder. In at least one example, one or more snap rings 766 can be affixed to the outer face of the seal mounting collar 754 to impede the clamp ring 756 from axially shifting. These structures, and/or any others, can contribute to a tight fit between the seal mounting collar 754 and the sleeve 742, such that the two can rotate together, and with the shaft.

In examples, a first seal 750*a* (e.g., rotating seal) of the mechanical seal 750 is operationally affixed to the sleeve 742 by way of the seal mounting collar 754. In some examples, the first seal 750*a* can be affixed directly to the sleeve 742. Any suitable device or method for securing the first seal 750*a* to the seal mounting collar 754 may be used. For example, the seal mounting collar 754 may include one or more grooves 768 that receive one or more inserts 770 (e.g., snap ring) that impede axial movement of the first seal 750*a*. Such an arrangement may be particularly advantageous since the axial positioning of the first seal 750*a* may be critical for maintaining a dynamic seal during drive shaft rotation. The insert 770 may be secured in place via a press-fit engagement, the use of an adhesive, the use of a fastener, etc.

In some examples, the second seal 750*b* (e.g., stationary seal) can abut the first seal 750*a* (e.g., the rotating seal). For example, the first seal ring 750*a* may include a first sealing face 772*a* that faces axially towards the second seal 750*b*, and the second seal ring 750*b* may include a second sealing face 772*b* that faces axially towards the first seal ring 750*a*. The first sealing face 772*a* may abut the second sealing face 772*b* (or be in near-contact such that the subject fluid is substantially prevented from flowing between the first sealing face 772*a* and the second sealing face 772*b*).

In examples, the second seal ring 750*b* can remain fixed or stationary, such that the second seal ring 750*b* does not rotate with the shaft 716. In examples, the second seal ring 750*b* is fixed in position relative to the shredding chamber more generally, and specifically with respect to the sidewall (e.g., 22, 722). For example, the sidewall 722 can include a first, inner panel or wall 722*a* and a second, outer panel or wall 722*b* (FIG. 7), and the second seal ring 750*b* can be affixed to the outer wall 722*b*.

In at least some examples, the second seal ring 750*b* is secured in position (e.g., stationary relative to the outer wall 722*b*) by way of a gland housing 774, which can be fastened (e.g., via one or more fasteners 775 shown in FIGS. 9B and 9C) to the wall 722*b*. In addition, the gland housing 774 can include an annular cavity 776 (e.g., annular groove or seat) for receiving the second seal ring 750*b*. In some examples, a drive pin 778 (e.g., multiple drive pins spaced around the gland housing 774) engages both the gland housing 774 and the second seal 750*b* to impede the second seal 750*b* from rotating relative to the gland housing 774. In the depicted embodiment, the drive pin 758 can be pressed into the side of the second seal ring 750*b* opposite the second sealing face 772*b*. In some examples, other (or additional) methods of securing the drive pin 778 to the second seal ring 750*b* can be used (e.g., bonding with an adhesive, a fastener, etc.). Similarly, the drive pin 778 may secure to the gland housing 774 through any suitable apparatus and/or method, such as via receipt within a recess of the gland housing 774. While one drive pin 778 may be sufficient to impede rotation of the second seal ring 750*b*, it may be desirable for similar drive pins to be included wherever a spring (e.g., 777) is included, as rotation of the second seal ring 750*b* may interrupt operation of the springs.

In examples, the first sealing face 772*a* may be configured to generally slide along the second sealing face 772*b* in a rotatable manner during rotation of the drive shaft 716. To avoid undue friction, heat, wear, and other detriments, the first sealing face 772*a* and the second sealing face 772*b* may be designed with relatively tight tolerances and of certain suitable materials. For example, the first sealing face 772*a* and the second sealing face 772*b* (and perhaps the entirety of the first seal ring 750*a* and the second seal ring 750*b*) may be formed from a material composition including silicon carbide, and certain embodiments include an optional metallic face seal combination of silicon bronze and stainless steel (of various grades) on one or more sealing faces. Optionally (and perhaps unnecessarily), the contact area of the first sealing face 772*a* and the second sealing face 772*b* may be lubricated, and/or lubrication may naturally occur during operation of the device.

h at least some examples, a spring 777 (FIG. 9C) may be included for causing a constant, axial contact pressure between the first sealing face 772*a* and the second sealing face 772*b*. In the depicted example of FIGS. 9C, the spring 777 is a helical compression spring having a first spring end abutting a spring seat 780 (FIG. 9B) formed in the gland housing 774, and a second spring end abutting the second seal ring 750*b*. Thus, when the helical compression spring 777 is in a compressed/shortened state relative to its typical, non-compressed length, it may impart a substantially constant axial force on the second seal ring 750*b* axially towards the first seal ring 750*a*.

In at least some example, since the collar 754 rotates with the drive shaft 716, while the second seal ring 750*b* remains stationary and fixed in position relative to the shredding chamber (e.g., relative to the sidewall), operation of the shredding system (e.g., the rotation of the shaft 716) can causes relative movement between the second seal ring 750*b* and the collar 754. In at least some examples, an inner diameter of the second seal 750*b* can be larger than an outer diameter of the collar 754. In some examples, if these relative surface include direct contact, these components may be configured such that sliding or other relative movement occurs in a low-friction manner (e.g., via material composition of at least one of the second seal ring 750*b* and collar 754). Optionally, it is contemplated that the contact faces between these components may create a secondary or primary dynamic seal.

In examples, the annular cavity 776 of the gland housing 774 includes a radially-inward facing surface that is adjacent to, at least partially coextensive with, and potentially contacts/abuts an outer diameter surface of the second seal ring 750*b*. This engagement may be advantageous for ensuring precise radial positioning of the second seal ring 750*b* (e.g., impeding the second seal ring 750*b* from expanding or moving outward or shifting relative to the axis).

As mentioned, the gland housing 774 can be secured to the shredder via any suitable device. In some examples, the gland housing 774 and the outer wall 722*b* can include one or more through holes that are aligned and that can receive a fastener 775.

In examples, the axial position of the gland housing 774 can contribute to a more uniform contact pressure between the first seal ring 750*a* and the second seal ring 750*b*, as the axial position of the gland housing 774 has a direct impact on the degree of spring compression of the spring 777. At least some examples of the present disclosure can include one or more setting clips 782. In examples, a setting clip 782 can be secured to the clamp ring 756 (e.g., via the fastener 784). Notably, the means of securing the setting clip 782 in place, using a screw or otherwise, is of limited importance so long as the setting clip 782 is capable of being fixed to the drive shaft 716, the collar 754, and/or sleeve 742 in an axially-precise manner. A groove of the setting clip 782 may be configured (e.g., sized and shaped) to receive a protrusion 786 (e.g., FIG. 7) extending from the gland housing 774.

The protrusion 786 of the gland housing 774 may extend in a radial direction, thereby being a limiting feature for axial movement of the gland housing 774. During installation of the gland housing 774, the gland housing 774 may be set in place and then engaged with the setting clip 782 as the setting clip 782 is secured in place. The setting clip 782 can maintain the axial positioning of the gland housing 774, such as while other assembly steps are completed (e.g., including spring and sealing ring placement, installation of the fasteners, etc.). Once installation is complete, the setting clip 782 may be released and removed.

In at least some examples, and referring also to FIG. 7, a position of the protrusion 786 and the collar 756 contribute to easier installation. For example, the gland housing 774 can include a radial wall extension 787 that extends away from the spring seat 780 and that also positions the protrusion 786 further away from the other portions of the gland housing 774. In examples, the positions (e.g., the positioning of the protrusion out further away) can allow the setting clip 782 and associated screw to be axially clear of the outer wall **722*b* (e.g., the outer face of the outer wall 722*b* shown in FIG. 7), which may significantly simplify removal of the setting clip 782 (e.g., a long socket extension may radially approach the setting clip's screw since the support 150 due to the length of the gland housing extension 182**).

Figure 9C:
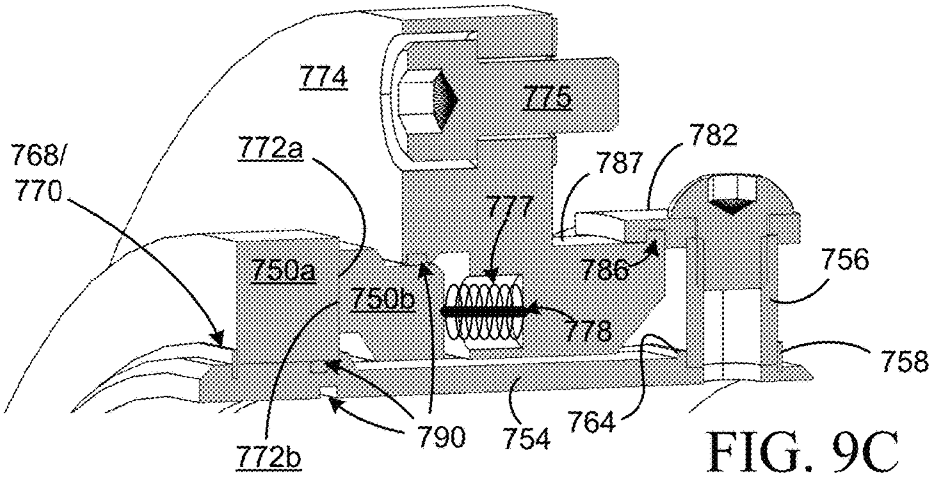

As mentioned above, the sealing faces of the first seal ring **750*a* and the second seal ring 750*b* may form a fluid seal, which may act as the primary fluid seal of the dynamic sealing system 750 (and capable of sufficient sealing without secondary sealing devices). However, secondary sealing devices may be included in a variety of locations to act as backup devices, prevent leakages, and/or otherwise enhance the overall sealing capabilities of the dynamic sealing system 750. For example, O-rings may be located between certain components, particularly those that do not move relative to one another during shredder operation. For example, an O-ring 745 may be included between the drive shaft 716 and the sleeve 742. Similarly, and as shown by FIG. 9C, O-rings may be included in any other suitable location 790, such as between the sleeve 742 and the cylindrical interface 754, between the seals 750*a*/750*b* and abutting structures, between any adjacent wall components, and/or at any other suitable location (including, but not limited to, those locations shown in FIG. 9**C). Wherever an O-ring is included, an associated O-ring groove may also be located for maintaining placement of the O-ring.

Figure 10:
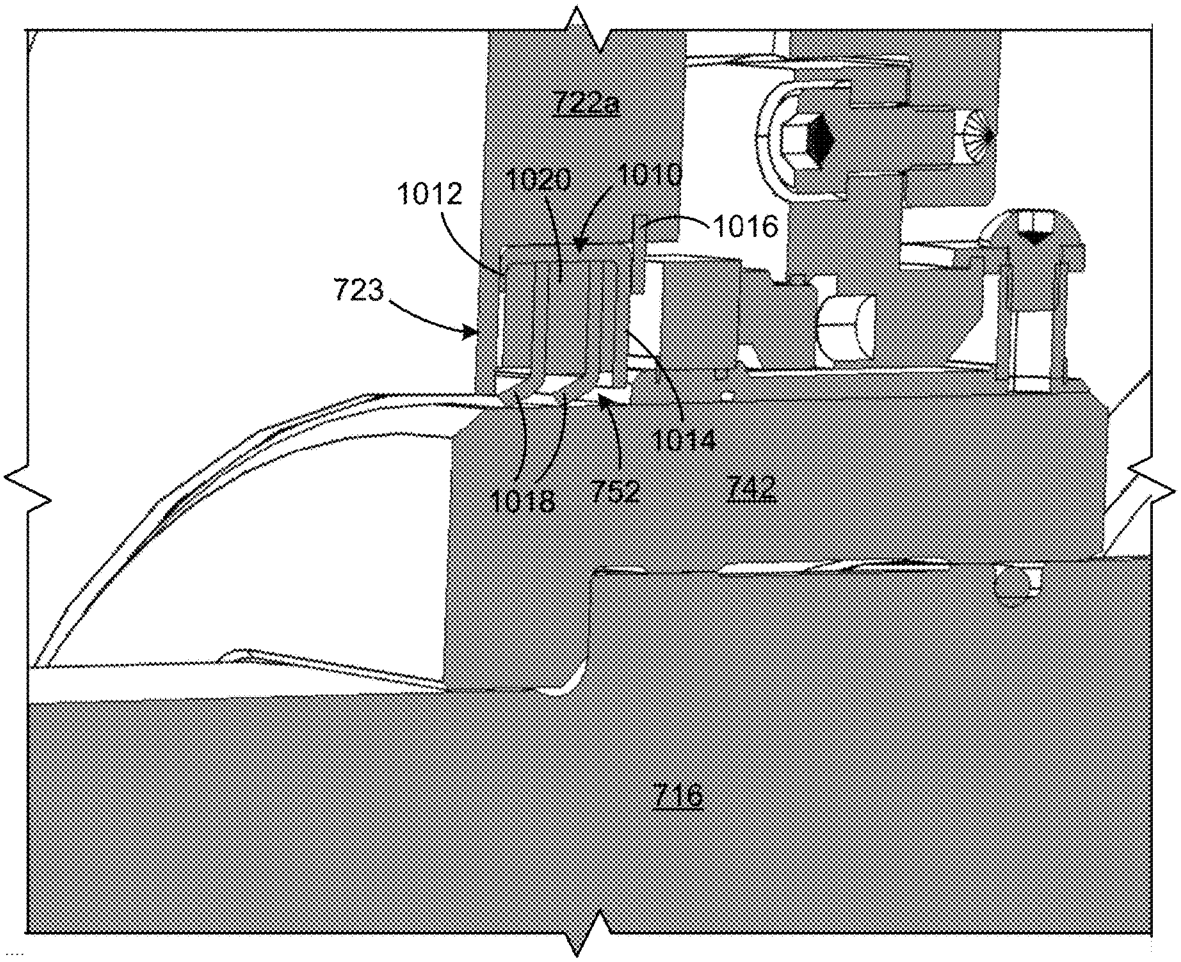
FIG. 10 depicts examples associated with a wiper seal in accordance with certain aspects of the present disclosure.

In examples, and referring to FIG. 10, a wiper seal 752 (may also be referred to as a debris barrier) can reduce the likelihood of fluid and/or shredded fragments leaking from the shredding chamber. In some examples, the wiper seal 752 can be used in combination with the mechanical seal 750. In some examples, the wiper seal 752 can be used without the mechanical seal 750 or in combination with another type of seal. For example, the wiper seal 752 can be used in combination with a lip seal (e.g., 1150)

Figure 3A:
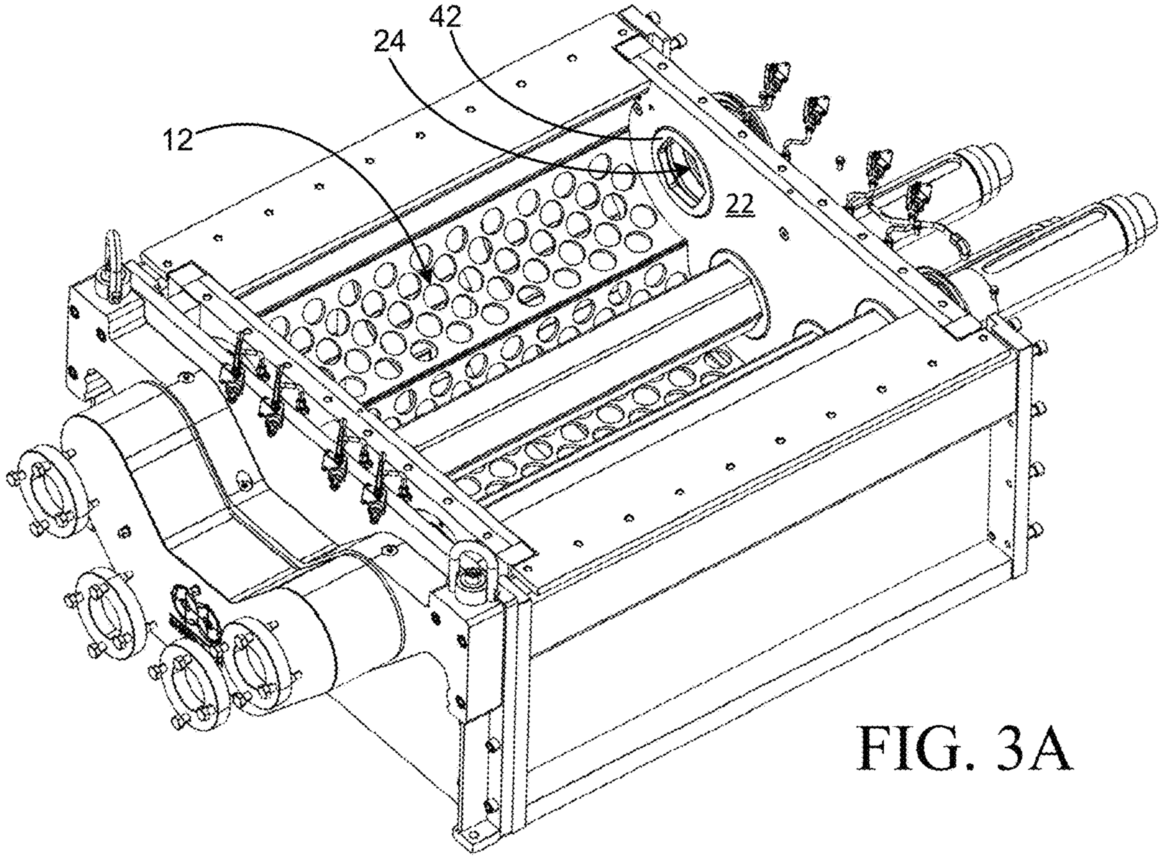
FIG. 3A depicts a different perspective of the shredding assembly in FIG. 1 with shredding instruments and a shaft omitted to reveal an opening in another wall of the shredding assembly.
Figure 3B:
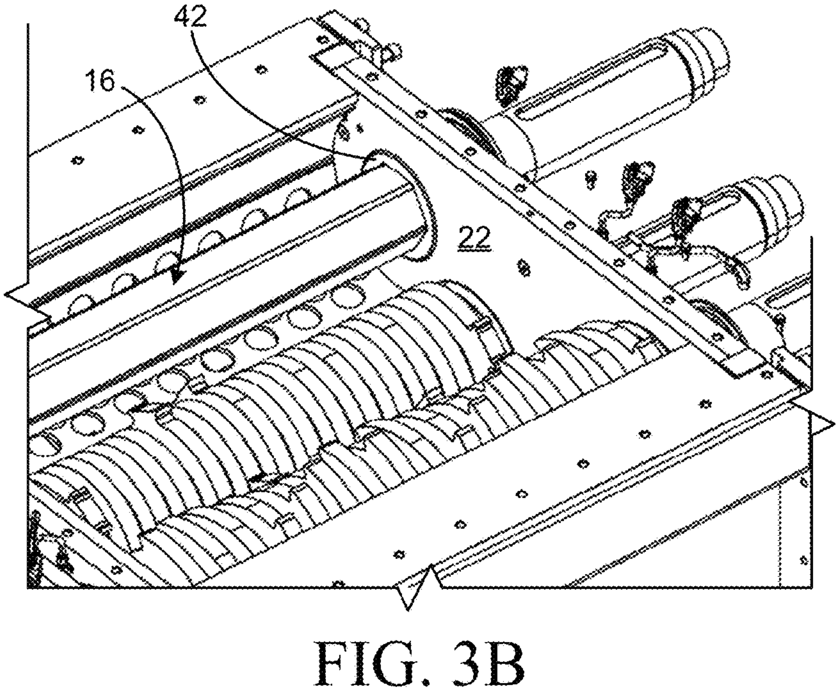
FIG. 3B depicts the shredding assembly of FIG. 3A with the shaft.
Figure 3C:
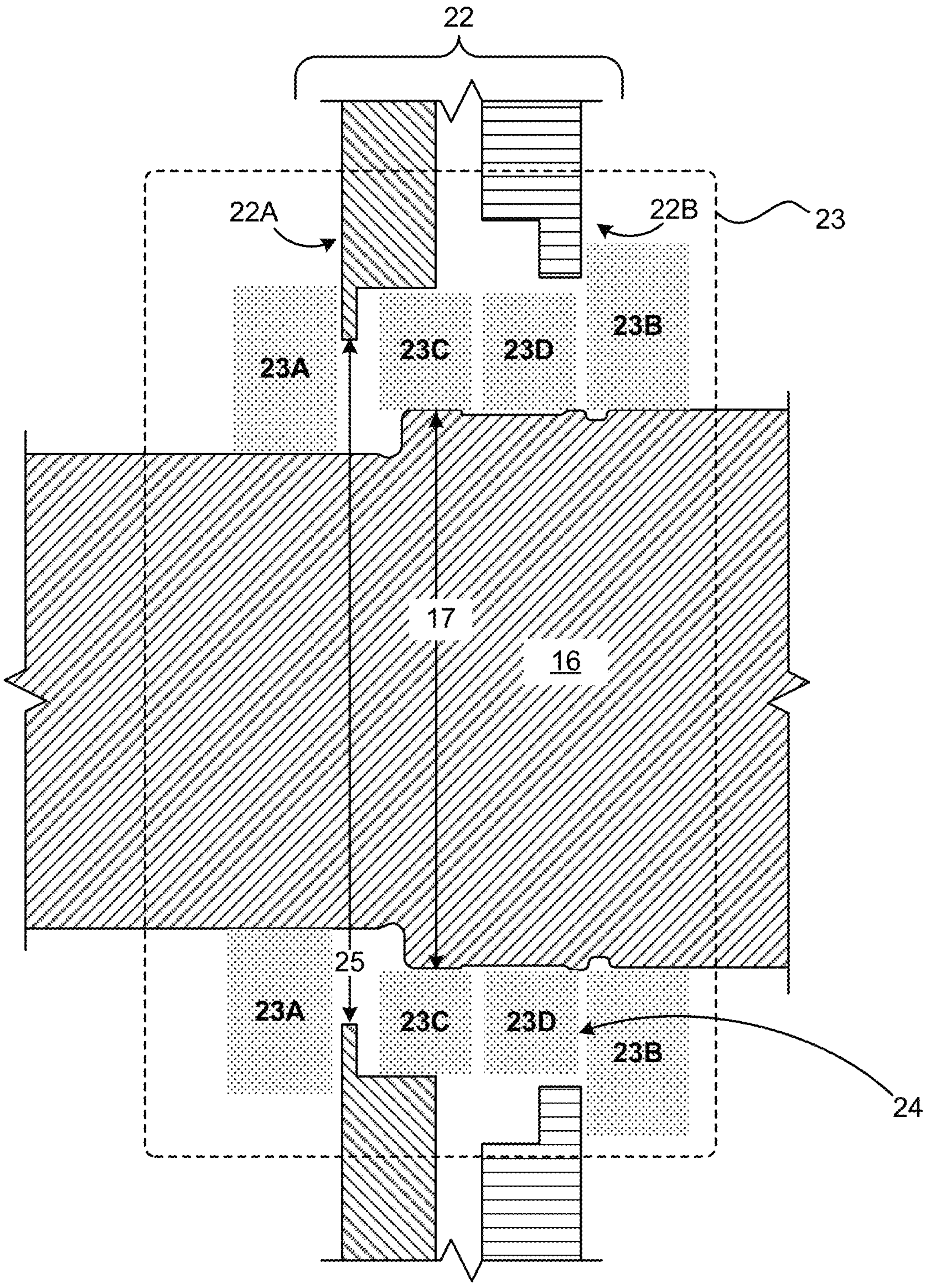
FIG. 3C depicts a cross section showing the shaft and a sidewall of a shredding chamber.
Figure 4A:
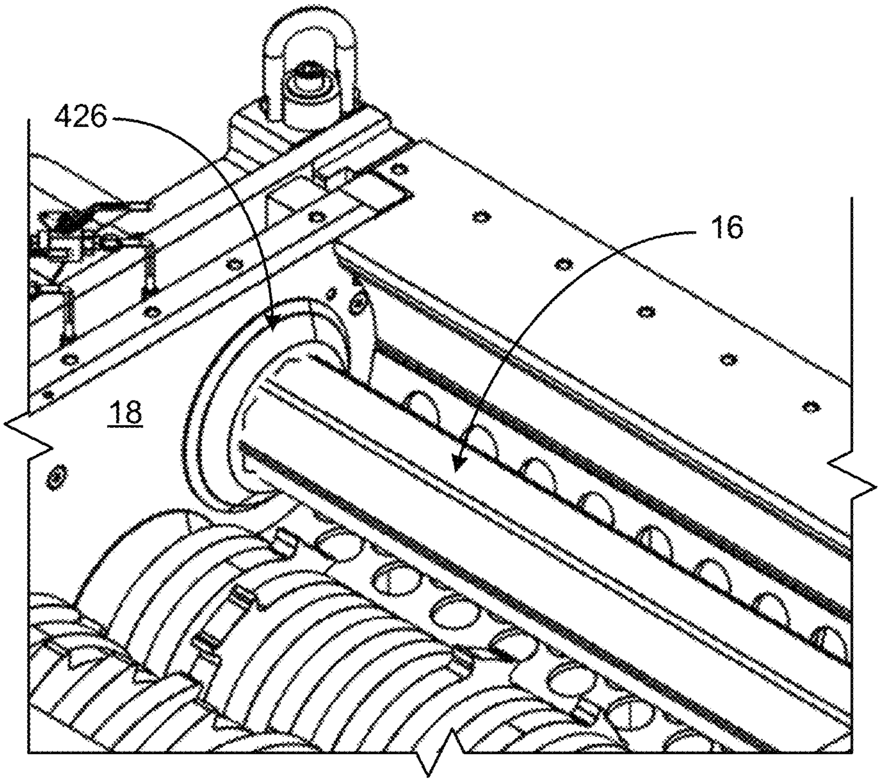
FIG. 4A depicts a spacer that can attach to the shaft depicted in FIG. 2B.
Figure 4B:
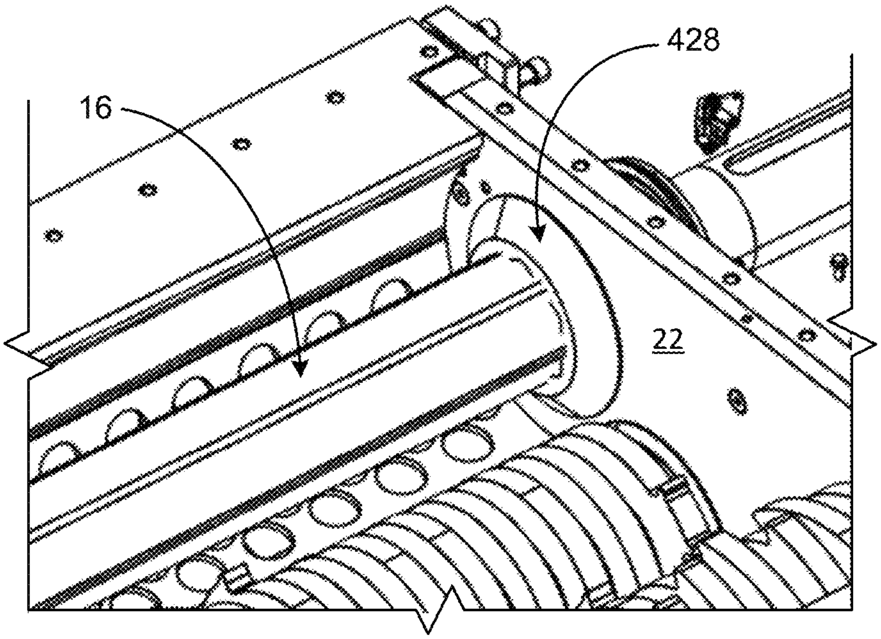
FIG. 4B depicts a spacer that can attach to the shaft depicted in FIG. 3B.

In at least some examples, the wiper seal 752 can be arranged adjacent the sidewall (e.g., 22 or 722), and FIG. 10 depicts the inner wall or panel **722*a* (e.g., in the area 23*c* identified in FIG. 3C). For example, the sidewall 722*a* can form at least part of a perimeter around the opening through which the shaft 716 extends, and in some examples, the sidewall 722*a* can include an annular lip or flange 723. In some examples, the annular lip 723 can at least partially enclose a space for receiving and containing the wiper seal 752**.

In some examples, the wiper seal 752 can include a wiper-seal housing 1010 for coupling together, and protecting, the parts (e.g., wipers and spacers) of the wiper seal 752 and for helping to hold the wiper seal 752 in position relative to other structures (e.g., other structures of the shredder). For example, the wiper-seal housing can include a channel in which the parts of the wiper seal are contained. A first side 1012 of the channel can abut the annular lip 723 of the inner wall **722*a*. In addition, a second side 1014 of the channel can abut a snap ring 1016, or other retainer, that is fixed relative to the inner panel 722*a***.

In examples, the wiper-seal housing 1010 can secure one or more wipers 1018 (e.g., compliant rings), which can include a distal end wiper lip configured to engage the sleeve 742. The wipers 1018 and 1020 can be compressed in the channel and held in position, such as with (or compressed between) one or more spacers 1020. During operation, as the sleeve 742 spins, the wipers 1018 may slide along the outer face of the sleeve 742, maintaining contact, and substantially preventing shredded materials and other debris from bypassing the wiper seal 752. Advantageously, the wiper seal 752 may protect the mechanical seal 750 and other components of the dynamic sealing system from being damaged by shredded material floating within the liquid.

Examples of the present disclosure can include one or more other (or alternative) seal assemblies (as compared to the spacer(s), mechanical seal(s), wiper seal(s), etc.) described in other parts of this disclosure. For example, referring to FIG. 11, a cross section is depicted that is similar to FIG. 6 and that depicts a portion of a shredder. FIGS. 12A and 12B illustrate at least some of the components shown in FIG. 11, and from a different perspective view. In some examples, the shredder associated with FIGS. 11, 12A, and 12B can include many of the same components as described in other parts of this disclosure (e.g., fluid-immersion shredding chamber, sidewalls, openings in the sidewalls, shafts extending through the openings, shredding instruments affixed to the shafts, etc.). For brevity, these additional components may not be described in extensive detail, and the components depicted, and described with respect to, FIGS. 11, 12A, and 12B can be included in a fluid-immersion shredder with any combination of those other components.

In examples, a shredder can include a sidewall 1122 (e.g., of a fluid shredding chamber), and in examples, the sidewall 1122 can include an inner wall or panel **1122*a* and an outer wall or panel 1122*b*. In addition, a shaft 1116 extends through an opening in the sidewall 1122 and into the shredding chamber 1112, where the shaft 1116 is coupled with shredding instruments 1114** (e.g., teeth and spacers).

In some examples, a shredder assembly can include a labyrinth seal 1152 within the opening and in the gap between the sidewall 1122 and the shaft 1116. For example, the labyrinth seal 1152 can be in the space **23*c* identified in FIG. 3**C.

In some examples, a shredder assembly can include a one or more lip seals 1150 within the opening and in the gap between the sidewall 1122 and the shaft 1116. For example, the one or more lip seals 1150 can be in the space 23*d* identified in FIG. 3C.

In at least some examples, a sleeve 1142 (e.g., FIG. 13 and including a first sleeve 1142*a* and a second sleeve 1142*b*) is positioned adjacent an outer face of the shaft 1116. The sleeve 1142 can include at least some properties similar to the sleeve 742. For example, the sleeve 1142 can be fixed to the drive shaft 1116 such that when the drive shaft 1116 rotates, the sleeve 1142 also rotates. The sleeve 1142 can include any of the other properties described with respect to the sleeve 742, such as the first end with the profile (e.g., as illustrated in FIG. 13) corresponding with the shaft (e.g., forming a keyed relationship that contributes to the sleeve 1142 rotating together with the shaft 1116); the second end with the larger cross dimension, and the outer face that is conducive to interface with other sealing elements.

In some examples, the sleeve 1142 can include a multi-component sleeve, which can include a first sleeve 1142*a* and a second sleeve 1142*b* that are fixedly attached to one another (e.g., by fasteners extending through the openings 1342 in FIG. 13*b*). In some examples, each of the sleeves 1142*a* and 1142*b* can be configured to sealingly interact with other parts of the assembly. For example, the sleeve 1142*a* can be configured to interact with the labyrinth seal 1152 and the sleeve 1142*b* can be configured to interact with the lip seal 1150. In some examples, the sleeve 1142 can include a single, integrally formed part, as opposed to two sleeves 1142*a/b* that are affixed together.

In at least some examples, the labyrinth seal 1152 includes a rotor 1152*a* (that is configured to rotate with the shaft 1116) and a stator 1152*b* (that is configured to remain fixed, relative to the sidewall).

In some examples, the rotor 1152*a* can include a circular ring that is affixed to the sleeve 1142. For example, the rotor 1152*a* and the sleeve 1142 can include openings that can align with one another and receive a fastener 1153. As such, the rotor 1152*a* is fixed, relative to the sleeve 1142 and can rotate together with the sleeve 1142, when the shaft 1116 rotates.

In some examples, the stator 1152*b* can include a circular ring that is coupled to the wall or panel 1122*a* (e.g., via a threaded fastener—not shown), and that is fixed in position relative to the wall or the panel 1122*a*. In examples, when the shaft 1116 rotates, the stator 1152*b* remains stationary.

In one or more examples, the rotor 1152*a* and the stator 1152*b* are in a face-sharing relationship, and the respective faces that are oriented towards one another and are directly adjacent one another comprise a sealing interface. In some examples, at least one of the rotor 1152*a* and the stator 1152*b* includes an annular projection 1155*a* (e.g., tooth or rib or other positive structure), and the other of the rotor 1152*a* and the stator 1152*b* includes an annular groove or channel (e.g., 1155*b*) or other negative structure that corresponds or mates with the projection in a sliding relationship. That is, when the rotor 1152*a* rotates relative to the stator 1152*b*, the projection slides in the corresponding groove or channel.

In FIG. 12A, the annular projection and annular channel are identified in a dash box and by reference numeral 1152*a/b*. In at least some examples, the rotor 1152*a* can include one or more annular projections and the stator 1152*b* can include one or more corresponding annular channels. In at least some examples, the rotor 1152*a* can include one or more annular channels and the stator 1152*b* can include one or more corresponding annular projections. In at least some instances, the combination of the one or more annular projections and corresponding one or more annular channels can provide a sealing interface that impedes liquid and/or shredded fragments from leaking from the shredding chamber 1112.

In at least some examples, a shredder can include various sealing structures that engage with the sleeve 1142, and specifically with the part 1142*b* of the sleeve 1142. In examples, the sleeve 1142*b* rotates together with the shaft 1116. In addition, the one or more lip seals 1150 (or 1150*a* and 1150*b* in FIG. 12B) can be fixedly secured relative to the sidewall 1122, and specifically relative to the outer panel 1122*b*. In at least some examples, the lip seals 1150*a/b* can be secured or fixed in position relative to the outer panel 1122*b*.

In at least some examples, the outer panel 1122*b* includes an annular recess 1123 that is configured to retain or receive at least a portion of a lip seal 1150*a*. In addition, the lip seal 1150*a* can include an annular flange 1151*a* that can nest up against the outer panel 1122*b*. In some examples, a lip-seal retainer bracket 1157 can be positioned against the lip seal 1150*a*, such that the annular flange 1151*a* is captured between the lip-seal retainer bracket 1157 and the outer panel 1122*b*.

In at least some examples, the lip-seal retainer bracket 1157 can also include an annular recess 1159, which is configured to retain or receive at least a portion of the other lip seal 1150*b*. In addition, the lip seal 1150*b* can include an annular flange 1151*b* that can nest up against the lip-seal retainer bracket 1157. In some examples, a lip-seal retainer flange 1160 can be positioned against the lip seal 1150*b*, such that the annular flange 1151*b* is captured between the lip-seal retainer bracket 1157 and the lip-seal retainer flange 1160.

In at least some examples, one or more fasteners 1162 can be affixed to the lip-seal retainer flange 1160, the lip-seal retainer bracket 1157, and the outer panel 1122*b*, which can capture the lip seals 1150*a* and 1150*b* in position and fix the lip seal position relative to the outer panel 1122*b*.

In at least some examples, during shredder operation, as the sleeve 1142*b* rotates spins, the lip seals 1150*a* and 1150*b* can slide along the outer face of the sleeve 1142*b*, maintaining contact, and substantially preventing fluid, shredded materials, and other debris from bypassing the lip seals 1150*a* and 1150*b*.

In at least some examples, one or more biasing elements (not shown), such as a spring, can be coupled with the lip seals 1150*a* and 1150*b* and can bias the sealing lip towards the sleeve 1142*b*.

In at least some examples, an outer face (e.g., outer-diameter face) of the sleeve 1142*b* is angled along at least a portion 1344 (e.g., FIG. 13B). In addition, the outer panel 1122*b* can include an annular inner terminal edge that is also angled, such as along the portion 1127 (e.g., FIG. 12B). In examples, the faces include angles that correspond with one another to contribute to assembly and closer tolerances between the various components, so as to reduce the likelihood of fluid and/or debris leaking from the shredding chamber.

Clauses

In addition to the claims at the end of this specification, the following clauses represent example aspects of concepts contemplated herein. Any one of the following clauses may be combined in a multiple dependent manner to depend from one or more other clauses. Further, any combination of dependent clauses (clauses that explicitly depend from a previous clause) may be combined while staying within the scope of aspects contemplated herein. The following clauses are examples and are not limiting.

Clause 1: A shredding system, comprising: a drive shaft having a first side coupled to one or more shredding knives and a second side coupled to a drive actuator for causing rotation of the drive shaft; a first seal ring surrounding a portion of the drive shaft, wherein the first seal ring is substantially rotatably fixed relative to the drive shaft such that when the drive shaft rotates, the first seal ring also rotates; a second seal ring located adjacent to the first seal ring, wherein the drive shaft is rotatable relative to the second seal ring such that when the drive shaft rotates, the first seal ring rotates relative to the second seal ring; and an immersion chamber at least partially surrounding the first side of the drive shaft, wherein a first sealing face of the first seal ring engages a second sealing face of the second seal ring to form a fluid seal, the fluid seal configured to prevent flow of a fluid within the immersion chamber towards the second side of the drive shaft.

Clause 2: The shredding system of clause 1, further comprising a spring that mechanically engages the second seal ring, wherein the spring causes a default axial contact pressure between the first sealing face and the second sealing face.

Clause 3: The shredding system of clause 2, further comprising a gland housing that is substantially fixed relative to a non-rotatable support, wherein the gland housing comprising a spring seat that abuts a first end of the spring.

Clause 4: The shredding system of clause 3, wherein a second end of the spring abuts the second seal ring.

Clause 5: The shredding system of clause 3, wherein the gland housing includes a head structure having a radially-inward facing surface that is adjacent to, and at least partially coextensive with, a radially-outward facing surface of the second seal ring.

Clause 6: The shredding system of clause 5, wherein the head structure includes a through-hole for receiving a fastener, the fastener being configured to secure the gland housing to the support.

Clause 7: The shredding system of clause 3, further comprising an axial positioning device configured to engage the gland housing, wherein the axial positioning device includes a removeable setting clip configured to prevent axial movement of the gland housing.

Clause 8: The shredding system of clause 7, wherein the gland housing includes a gland housing extension that extends axially from a head portion of the gland housing, and wherein the setting clip is configured to engage an end of the gland housing extension.

Clause 9: The shredding system of clause 1, further comprising a debris barrier located adjacent to the immersion chamber and configured to prevent debris from approaching the first seal ring, wherein the debris barrier includes at least one compliant ring, and wherein the drive shaft is rotatable relative to the at least one compliant ring.

Clause 10: The shredding system of clause 1, further comprising a debris barrier located adjacent to the immersion chamber and configured to prevent debris from approaching the first seal ring, wherein the debris barrier includes at least one compliant sealing arm, and wherein the at least one compliant sealing arm is rotatably fixed relative to the drive shaft such that when the drive shaft rotates, the at least one compliant sealing arm also rotates.

Clause 11: A dynamic sealing system for a shredding system, comprising: a first seal ring configured for surrounding a portion of a drive shaft of the shredding system, wherein during operation of the shredding system, the first seal ring is substantially rotatably fixed relative to the drive shaft such that when the drive shaft rotates, the first seal ring also rotates; and a second seal ring located adjacent to the first seal ring, wherein during operation of the shredding system, the drive shaft is rotatable relative to the second seal ring such that when the drive shaft rotates, the first seal ring rotates relative to the second seal ring, wherein a first sealing face of the first seal ring engages a second sealing face of the second seal ring to form a fluid seal, the fluid seal configured to prevent flow of a fluid within an immersion chamber of the shredding system towards a drive actuator of the shredding system.

Clause 12: The dynamic sealing system of clause 11, further comprising a spring that mechanically engages the second seal ring, wherein the spring causes a default axial contact pressure between the first sealing face and the second sealing face.

Clause 13: The dynamic sealing system of clause 12, further comprising a gland housing that configured for fixture relative to a non-rotatable support of the shredding system, wherein the gland housing comprising a spring seat that abuts a first end of the spring.

Clause 14: The dynamic sealing system of clause 13, wherein a second end of the spring abuts the second seal ring.

Clause 15: The dynamic sealing system of clause 13, wherein the gland housing includes a head structure having a radially-inward facing surface that is adjacent to, and at least partially coextensive with, a radially-outward facing surface of the second seal ring.

Clause 16: The dynamic sealing system of clause 15, wherein the head structure includes a through-hole for receiving a fastener, the fastener being configured to secure the gland housing to the support.

Clause 17: The dynamic sealing system of clause 13, further comprising an axial positioning device configured to engage the gland housing, wherein the axial positioning device includes a removeable setting clip configured to prevent axial movement of the gland housing.

Clause 18: The dynamic sealing system of clause 17, wherein the gland housing includes a gland housing extension that extends axially from a head portion of the gland housing, and wherein the setting clip is configured to engage an end of the gland housing extension.

Clause 19: The dynamic sealing system of clause 11, further comprising a debris barrier configured to prevent debris from approaching the first seal ring, wherein the debris barrier includes at least one compliant ring, and wherein during operation of the shredding system of the shredding system, the drive shaft is rotatable relative to the at least one compliant ring.

Clause 20: A method, comprising: forming a shredding system, the shredding system comprising: a drive shaft having a first side coupled to one or more shredding knives and a second side coupled to a drive actuator for causing rotation of the drive shaft; a first seal ring surrounding a portion of the drive shaft, wherein the first seal ring is substantially rotatably fixed relative to the drive shaft such that when the drive shaft rotates, the first seal ring also rotates; a second seal ring located adjacent to the first seal ring, wherein the drive shaft is rotatable relative to the second seal ring such that when the drive shaft rotates, the first seal ring rotates relative to the second seal ring; and an immersion chamber at least partially surrounding the first side of the drive shaft, wherein a first sealing face of the first seal ring engages a second sealing face of the second seal ring to form a fluid seal, the fluid seal configured to prevent flow of a fluid within the immersion chamber towards the second side of the drive shaft.

This detailed description is provided in order to meet statutory requirements. However, this description is not intended to limit the scope of the invention described herein. Rather, the claimed subject matter may be embodied in different ways, to include different steps, different combinations of steps, different elements, and/or different combinations of elements, similar or equivalent to those described in this disclosure, and in conjunction with other present or future technologies. The examples herein are intended in all respects to be illustrative rather than restrictive. In this sense, alternative examples or implementations can become apparent to those of ordinary skill in the art to which the present subject matter pertains without departing from the scope hereof.

The invention claimed is:

1. A fluid-immersion shredder comprising:

a shredding chamber comprising a wall that is configured to contain a fluid within an interior volume of the shredding chamber, wherein the wall comprises an opening;

a drive shaft extending through the opening and into the interior volume of the shredding chamber, the drive shaft comprising an outer diameter surface and a first side of the drive shaft is coupled to one or more shredding knives;

a sleeve, wherein the sleeve is coupled to the drive shaft, wherein the sleeve is positioned in the opening of the wall of the shredding chamber;

one or more sealing assemblies coupled to at least one of the wall of the shredding chamber or the sleeve; and a spacer coupled to the drive shaft, wherein the spacer comprises an outer terminal edge, a first face that faces towards the wall, a second face that faces toward the interior volume away from the wall, and an angled annular face extending from a peripheral edge of the second face to the outer terminal edge; wherein the angled annular face transitions in diameter from a smaller dimension from the peripheral edge to a larger dimension at the outer terminal edge.

2. The fluid-immersion shredder of claim 1, wherein the spacer comprises a through hole having a hole shape profile with one or more linear sides, wherein the drive shaft comprises a first cross-sectional profile that is a same shape as the hole shape profile and that is smaller than the hole shape profile, and wherein the drive shaft extends through the through hole of the spacer.

3. The fluid-immersion shredder of claim 2, wherein the first face comprises a central portion and a peripheral portion, wherein the central portion faces and abuts the sleeve and the peripheral portion faces and abuts the wall of the shredding chamber.

4. The fluid-immersion shredder of claim 1, wherein:

the one or more sealing assemblies comprise a mechanical seal comprising a first seal and a second seal;

the first seal is fixedly coupled relative to the sleeve and is configured to rotate with the drive shaft and rotate relative to the wall; and the second seal is fixedly coupled relative to the wall.

5. The fluid-immersion shredder of claim 1, wherein:

the one or more sealing assemblies comprise a wiper seal; and the wiper seal is fixedly coupled relative to the wall and comprises one or more wipers that engage the sleeve.

6. The fluid-immersion shredder of claim 1, wherein:

the one or more sealing assemblies comprise a lip seal; and the lip seal is fixedly coupled relative to the wall and comprises one or more lip seal edges that engage the sleeve.

7. The fluid-immersion shredder of claim 1, wherein:

the one or more sealing assemblies comprise a labyrinth seal comprising a rotor and a stator;

the rotor is fixedly coupled relative to the sleeve and is configured to rotate with the drive shaft and rotate relative to the wall; and the stator is fixedly coupled relative to the wall.

8. The fluid-immersion shredder of claim 1, wherein the spacer rotates with the drive shaft when the drive shaft rotates.

9. A fluid-immersion shredder comprising:

a shredding chamber comprising a wall that is configured to contain a fluid within an interior volume of the shredding chamber, wherein the wall comprises an opening;

a drive shaft extending through the opening and into the interior volume of the shredding chamber, the drive shaft comprising an outer diameter surface and a first side of the drive shaft is coupled to one or more shredding knives;

a sleeve, wherein the sleeve is coupled to the drive shaft, and wherein the sleeve is positioned in the opening of the wall; and a spacer comprising:

a through hole comprising a hole shape profile with one or more linear sides, wherein the drive shaft extends through the through hole and comprises a first cross-sectional profile shape that is a same shape as the hole shape profile and that is smaller than the hole shape profile;

a first face, wherein a central portion of the first face of the spacer faces and abuts the sleeve and a peripheral portion of the first face of the spacer faces and abuts the wall; and a second face that faces toward the interior volume from the wall.

10. The fluid-immersion shredder of claim 9, wherein the spacer comprises an angled annular face extending from a peripheral edge to an outer terminal edge of the spacer, wherein the angled annular face faces away from the wall and transitions in diameter from a smaller dimension near a peripheral edge to a larger dimension at an outer terminal edge.

11. The fluid-immersion shredder of claim 9 further comprising, one or more sealing assemblies coupled to at least one of the wall or the sleeve.

12. The fluid-immersion shredder of claim 11, wherein the one or more sealing assemblies comprises:

a wiper seal that is fixedly coupled relative to the wall; and a mechanical seal.

13. The fluid-immersion shredder of claim 12, wherein:

the mechanical seal comprises a first seal and a second seal;

the first seal is fixedly coupled relative to the sleeve and is configured to rotate with the drive shaft and rotate relative to the wall; and the second seal is fixedly coupled relative to the wall.

14. The fluid-immersion shredder of claim 9, wherein:

the central portion of the first face of the spacer is recessed relative to the peripheral portion of the first face of the spacer; and the first face comprises an annular shoulder that connects the central portion to the peripheral portion.

15. The fluid-immersion shredder of claim 14, wherein:

the annular shoulder comprises a first diameter; and the sleeve comprises a second diameter, which is smaller than the first diameter of the annular shoulder.

16. A fluid-immersion shredder comprising:

a shredding chamber comprising a wall that is configured to contain a fluid within an interior volume of the shredding chamber, wherein the wall comprises an opening;

a drive shaft extending through the opening and into the interior volume of the shredding chamber, the drive shaft comprising an outer diameter surface and a first side of the drive shaft is coupled to one or more shredding knives;

a multi-component sleeve comprising a first sleeve circumscribing the drive shaft abutting a labyrinth seal, and a second sleeve circumscribing the drive shaft abutting one or more lip seals, wherein the first sleeve and the second sleeve are fixedly attached to one another via a fastener, wherein the multi-component sleeve is coupled to the drive shaft, wherein the multi-component sleeve is positioned in the opening of the wall;

the one or more lip seals fixedly coupled relative to the wall and comprising one or more lip seal edges that engage the multi-component sleeve; and the labyrinth seal comprising a rotor and a stator, wherein the rotor is fixedly coupled to the multi-component sleeve and is configured to rotate with the drive shaft and rotate relative to the wall, and wherein the stator is fixedly coupled relative to the wall.

17. The fluid-immersion shredder of claim 16, wherein each of the one or more lip seals comprises a first lip seal and a second lip seal.

18. The fluid-immersion shredder of claim 17, wherein:

the wall comprises an annular recess; and the first lip seal is positioned in the annular recess and is secured between the wall and a lip-seal retaining bracket.

19. The fluid-immersion shredder of claim 18, wherein:

the lip-seal retaining bracket comprises a second annular recess; and a second lip seal is positioned in the second annular recess and is secured between the lip-seal retaining bracket and a lip-seal retaining flange.

20. The fluid-immersion shredder of claim 19, wherein:

a fastener extends through the lip-seal retaining flange and through the lip-seal retaining bracket and into the wall to fixedly secure together the first lip seal, the second lip seal, the lip-seal retaining flange, and the lip-seal retaining bracket.

* * * * *